United States Patent
Zavesky et al.

(10) Patent No.: US 10,841,652 B2
(45) Date of Patent: *Nov. 17, 2020

(54) AUDIOVISUAL CONTENT SCREENING FOR LOCKED APPLICATION PROGRAMMING INTERFACES

(71) Applicant: AT&T Intellectual Property I, L.P., Atlanta, GA (US)

(72) Inventors: Eric Zavesky, Austin, TX (US); David Crawford Gibbon, Lincroft, NJ (US); Bernard S. Renger, New Providence, NJ (US); Lee Begeja, Gillette, NJ (US); Zhu Liu, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/887,342

(22) Filed: May 29, 2020

(65) Prior Publication Data

US 2020/0296455 A1 Sep. 17, 2020

Related U.S. Application Data

(63) Continuation of application No. 16/117,768, filed on Aug. 30, 2018, now Pat. No. 10,694,250.

(51) Int. Cl.
*H04N 21/443* (2011.01)
*H04N 21/454* (2011.01)

(52) U.S. Cl.
CPC ....... *H04N 21/4431* (2013.01); *H04N 21/454* (2013.01)

(58) Field of Classification Search
CPC ............ H04N 21/4431; H04N 21/454; H04N 21/4532; H04N 21/4542; H04N 21/44008;

(Continued)

(56) References Cited

U.S. PATENT DOCUMENTS 6,181,364 B1 1/2001 Ford
6,317,795 B1 11/2001 Malkin et al.
(Continued)

FOREIGN PATENT DOCUMENTS

WO WO 2015/105207 7/2015

OTHER PUBLICATIONS

Vidangel, "Facts Concerning VidAngel's New Filtering Technology," blog.vidangel.com, Jun. 2017.

(Continued)

*Primary Examiner* — Cynthia M Fogg
(74) *Attorney, Agent, or Firm* — Hartman & Citrin LLC

(57) ABSTRACT

Concepts and technologies directed to screening streaming content with locked application programming interfaces are disclosed herein. Embodiments can include a system that is configured to perform operations that can include detecting a content stream directed to a media application on a user equipment, where audiovisual content of the content stream is presented on a display. The operations can include determining that an application programming interface corresponding to the media application is locked such that the audiovisual content from the content stream is not accessible via the application programming interface; accessing the audiovisual content that is being presented on the display without accessing the application programming interface corresponding to the media application; and scraping the audiovisual content from the display for a time period, wherein the scraping creates scraped audiovisual content corresponding to the audiovisual content that was presented on the display during the time period.

20 Claims, 10 Drawing Sheets

(58) Field of Classification Search
CPC ......... H04N 21/25891; H04N 21/4318; H04N 21/44029; H04L 51/12
USPC ........................................................ 725/25
See application file for complete search history.

(56) References Cited

U.S. PATENT DOCUMENTS

| | | |
|---|---|---|
| 6,337,947 B1 | 1/2002 | Porter et al. |
| 6,519,770 B2 | 2/2003 | Ford |
| 7,134,130 B1 | 11/2006 | Thomas |
| 7,360,234 B2 | 4/2008 | Robson et al. |
| 7,461,004 B2 | 12/2008 | Cormack et al. |
| 7,540,009 B1 | 5/2009 | Bryant et al. |
| 7,805,680 B2 | 9/2010 | Meyers et al. |
| 8,799,954 B1 | 8/2014 | Ellis |
| 8,819,263 B2 | 8/2014 | Jarman et al. |
| 8,826,322 B2 | 9/2014 | Bliss et al. |
| 8,831,953 B2 | 9/2014 | Vanjani |
| 8,949,878 B2 | 2/2015 | Dimitrova et al. |
| 9,015,571 B2 | 4/2015 | Jarman et al. |
| 9,288,387 B1 | 3/2016 | Keller |
| 9,357,242 B2 | 5/2016 | Sinha et al. |
| 9,363,561 B1 | 6/2016 | Harmon et al. |
| 9,380,342 B2 | 6/2016 | Tang et al. |
| 9,401,943 B2 | 7/2016 | LaVoie et al. |
| 9,445,151 B2 | 9/2016 | Greene |
| 9,501,702 B2 | 11/2016 | Skarakis |
| 9,602,871 B1 | 3/2017 | Holcomb et al. |
| 2010/0174722 A1 | 7/2010 | Carteri |
| 2012/0159530 A1 | 6/2012 | Ahrens et al. |
| 2012/0204201 A1 | 8/2012 | Cassidy |
| 2014/0344055 A1 | 11/2014 | Sanghavi |
| 2015/0033072 A1 | 1/2015 | Barr |
| 2015/0067717 A1 | 3/2015 | Oliver |
| 2015/0082335 A1 | 3/2015 | Cobb |
| 2016/0037217 A1 | 2/2016 | Harmon et al. |
| 2017/0272818 A1 | 9/2017 | Gattis et al. |
| 2017/0289624 A1 | 10/2017 | Avila et al. |
| 2017/0310488 A1 | 10/2017 | Wajs |
| 2017/0332137 A1 | 11/2017 | Kellner |
| 2019/0327224 A1 | 10/2019 | Zhang |

OTHER PUBLICATIONS

Clearplay Inc., "About ClearPlay," http://amazon.clearplay.com/what-is-clearplay/, Mar. 2, 2018.
Chirls, Brian, "Expletive Undeleted: Real-Time Bleeps and Blurs for Web Video," POV's Documentary Blog, American Documentary Inc., Sep. 9, 2014, retrieved at https://web.archive.org/web/20170330003042/http://www.pbs.org/pov/blog/povdocs/2014/09/expletive-undeleted-real-time-bleeps-and-blurs-for-web-video/ on Mar. 6, 2018.
Cleanspeak, "Cleanspeak Profanity Filter & Moderation," Inversoft, https://www.inversoft.com/products/profanity-filter, Dec. 26, 2017.
Sightengine, "Realtime Image & Video Moderation API," sightengine.com, Nov. 19, 2017.
Leong et al., "Creating a Python-based Portable Media Player with Enhanced Parental Control Capabilities," The Python Papers vol. 11 (2016), retrieved at http://ojs.pythonpapers.org/index.php/tpp/article/view/272/240 on Mar. 6, 2018.
U.S. Office Action dated Sep. 30, 2019 in U.S. Appl. No. 16/117,768.
U.S. Notice of Allowance dated Feb. 7, 2020 in U.S. Appl. No. 16/117,768.

AUDIOVISUAL CONTENT SCREENING FOR LOCKED APPLICATION PROGRAMMING INTERFACES

CROSS-REFERENCE TO RELATED APPLICATIONS

This application is a continuation of and claims priority to U.S. patent application Ser. No. 16/117,768, entitled "Audiovisual Content Screening for Locked Application Programming Interfaces," filed Aug. 30, 2018, now U.S. Pat. No. 10,694,250, which is incorporated herein by reference in its entirety.

BACKGROUND

Communications networks can provide streaming media content that can be presented to a viewing user on a user device. In some instances, the media content that is being presented may be objectionable or otherwise not appropriate for the viewing user. In other instances, the viewing user may be unaware of the type of images and/or audio that will be presented by the streaming media content. In conventional systems, an administrator, such as a parent, may access a settings menu within a media application on the viewing device to set a ratings limit in order to control access to media according to what is deemed appropriate for the viewing user based on the age, maturity level, or type of content. For example, the media content may have a preconfigured ratings designation, such as "R," "TV-MA," "TV-14," or other static ratings designation. Thus, conventional mechanisms to control the viewing of content may prevent access to the entire media program (e.g., a television show) if the media content does not conform to the settings limit. However, such broad ratings designators may limit access to otherwise non-objectionable material due to one scene or portion of the media content that exceeds the ratings limit or possibly is objectionable without exceeding the ratings limit. The streaming media content may be provided as part of a streaming media content service. Developers that provide the streaming media content service may provide a media application to a viewing user's device so that the streaming media content is viewed through the media application. In order to provide application security, the media application may have an application programming interface that is locked. If multiple streaming media content services are used, a parent or administrator may have to set up multiple media applications for each streaming media content service, while working within the options that are statically provided by the media application of the streaming media content service.

SUMMARY

The present disclosure is directed to audiovisual content screening for locked application programming interfaces, according to various embodiments. As used herein, the phrase "audiovisual content" refers to one or more data packets that are configured to include and/or represent media in the form of one or more digital images for visual playback on a device and/or one or more audio files for audible playback via audio output on of a device. As used herein, the phrase "content stream" (or variants thereof such as an assembled media stream) refers to a sequence of one or more data packets for the audio content and/or video content such that a device is configured by the content stream to present and provide visual and/or audio output corresponding to the data packets of the stream. It is understood that, as used in the claims, the phrases audiovisual content and content stream should not be construed as referring to an abstract idea, judicial exception, or any other non-patentable subject matter. It is understood that the examples discussed herein are for illustration purposes only, and therefore should not be construed as limiting in any way.

According to one aspect of the concepts and technologies disclosed herein, a system is disclosed. In some embodiments, the system can include a processor and a memory. In some embodiments, the processor and the memory of the system can be provided by a client edge device, such as but not limited to a router or a set-top box. The memory can store computer-executable instructions that, when executed by the processor, cause the processor to perform operations. In some embodiments, the operations can include detecting a content stream directed to a media application on a user equipment, where audiovisual content of the content stream is presented on a display of the user equipment via execution of the media application. The operations also can include determining that an application programming interface corresponding to the media application is locked such that the audiovisual content from the content stream is not accessible via the application programming interface. The operations also can include accessing the audiovisual content that is being presented on the display. In some embodiments, the operations can include accessing the audiovisual content that is being presented on the display without accessing the application programming interface corresponding to the media application. In some embodiments, accessing the audiovisual content can occur in response to determining that the application programming interface is locked. In some embodiments, accessing the audiovisual content can include bypassing the application programming interface of the media application such that the display is accessed directly. The operations can also include scraping the audiovisual content from the display for a time period, where the scraping creates scraped audiovisual content corresponding to the audiovisual content that was presented on the display during the time period.

In some embodiments, the operations also can include determining that an audiovisual content identifier that identifies the audiovisual content cannot be obtained from the media application based on the application programming interface being locked. In some embodiments, the operations can further include obtaining the audiovisual content identifier for the audiovisual content based on the scraped audiovisual content while the application programming interface remains locked. In some embodiments, the operations can further include determining that the content stream includes flagged audiovisual content corresponding to a queued portion of the audio visual content that has not been presented on the display. The operations can also include preparing an audiovisual content filter for the flagged audiovisual content. In some embodiments, the audiovisual content filter can include one or more of an audio clip replacement instruction, an audio clip cancellation instruction, a content redirect instruction, a processor buffer instruction, a time jump instruction, an image overlay block, a visual distortion block, or a content summary block. In some embodiments, the operations can include providing the audiovisual content filter to the display such that the audiovisual content filter filters the flagged audiovisual content provided by the media application without accessing the application programming interface.

According to another aspect of the concepts and technologies disclosed herein, a method is disclosed, according to an embodiment. The method can include detecting, by a system that is communicatively coupled to a user equipment, a content stream directed to a media application on the user equipment, where audiovisual content of the content stream is presented on a display of the user equipment via execution of the media application. The method also can include determining, by the system, that an application programming interface corresponding to the media application is locked such that the audiovisual content from the content stream is not accessible via the application programming interface. The method can include accessing, by the system, the audiovisual content that is being presented on the display. In some embodiments, the method can include accessing, by the system, the audiovisual content that is being presented on the display without accessing the application programming interface corresponding to the media application. In some embodiments, accessing the audiovisual content being presented on the display can occur in response to determining that the application programming interface is locked. In some embodiments, accessing the audiovisual content can include bypassing the application programming interface of the media application such that the display is accessed directly. The method can further include scraping, by the system, the audiovisual content from the display for a time period, where the scraping creates scraped audiovisual content corresponding to the audiovisual content that was presented on the display during the time period.

In some embodiments, the method can further include determining, by the system, that an audiovisual content identifier that identifies the audiovisual content cannot be obtained from the media application based on the application programming interface being locked. In some embodiments, the method can also include obtaining the audiovisual content identifier for the audiovisual content based on the scraped audiovisual content while the application programming interface remains locked. In some embodiments, the method can include determining, via the system, that the content stream includes flagged audiovisual content corresponding to a queued portion of the audio visual content that has not been presented on the display. The method can include preparing, by the system, an audiovisual content filter for the flagged audiovisual content. In some embodiments, the audiovisual content filter can include one or more of an audio clip replacement instruction, an audio clip cancellation instruction, a content redirect instruction, a processor buffer instruction, a time jump instruction, an image overlay block, a visual distortion block, or a content summary block. In some embodiments, the method can include providing the audiovisual content filter to the display such that the audiovisual content filter filters the flagged audiovisual content provided by the media application without accessing the application programming interface.

According to yet another aspect, a computer storage medium is disclosed. The computer storage medium can have computer-executable instructions stored thereon. When the computer-executable instructions are executed by a processor, the processor can perform operations. In some embodiments, the processor can be included in a computer system, such as a client edge device that can communicatively couple with a user equipment. In some embodiments, the operations can include detecting a content stream directed to a media application on a user equipment, where audiovisual content of the content stream is presented on a display of the user equipment via execution of the media application. The operations can include determining that an application programming interface corresponding to the media application is locked such that the audiovisual content from the content stream is not accessible via the application programming interface. The operations can include accessing the audiovisual content that is being presented on the display. In some embodiments, the operations can include accessing the audiovisual content that is being presented on the display without accessing the application programming interface that is locked corresponding to the media application. In some embodiments, the application programming interface that is locked may be referred to as a locked application programming interface. In some embodiments, accessing the audiovisual content can occur in response to determining that the application programming interface is locked. The operations can include scraping the audiovisual content from the display for a time period, where the scraping creates scraped audiovisual content corresponding to the audiovisual content that was presented on the display during the time period.

In some embodiments, the operations can further include determining that an audiovisual content identifier that identifies the audiovisual content cannot be obtained from the media application based on the application programming interface being locked. In some embodiments, the operations can further include obtaining the audiovisual content identifier for the audiovisual content based on the scraped audiovisual content while the application programming interface remains locked. In some embodiments, the operations can further include determining that the content stream includes flagged audiovisual content corresponding to a queued portion of the audio visual content that has not been presented on the display. In some embodiments, the operations can further include preparing an audiovisual content filter for the flagged audiovisual content. In some embodiments, the audiovisual content filter can include one or more of an audio clip replacement instruction, an audio clip cancellation instruction, a content redirect instruction, a processor buffer instruction, a time jump instruction, an image overlay block, a visual distortion block, or a content summary block. In some embodiments, the operations can further include providing the audiovisual content filter to the display such that the audiovisual content filter filters the flagged audiovisual content provided by the media application without accessing the application programming interface.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
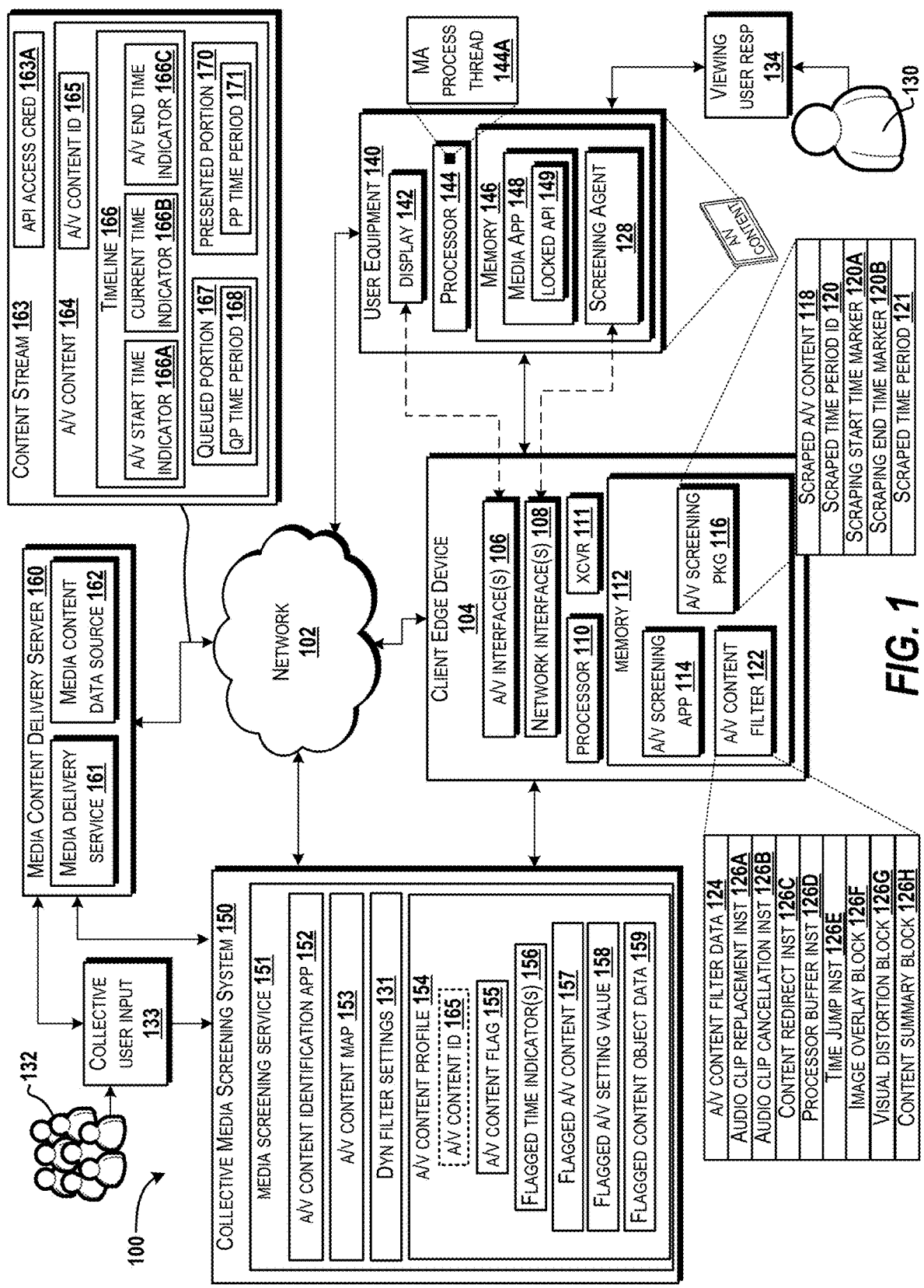
FIG. 1 is a block diagram illustrating an example operating environment for audiovisual content screening for locked application programming interfaces, according to an illustrative embodiment.

The following detailed description is directed to audiovisual content screening for locked application programming interfaces. In the past, a user's access to audiovisual content was dependent on physically traveling to a commercial establishment to rent and/or purchase physical mediums configured for playback of audiovisual content, such as but not limited to digital video disks and/or video home system tape cassettes. However, with the advancement of computing and networking, viewing users are able to access a variety of content through network delivered content streams across various web domains, such as streaming media services, social media websites, interactive media applications (e.g., social media applications, video sharing applications, video chats, etc.) or the like. Because various developers create and provide access to audiovisual content from encrypted content streams, third party access to the content stream, and audiovisual content included therein, may be limited and/or prevented due to an application programming interface ("API") of a media application being locked (referred to as a "locked API"). In some embodiments, different rendering formats for presenting audiovisual content may be employed, such as a media application that is associated with a social media platform and uses a scrolling content feed to present audiovisual content to a viewing user and/or a media application that uses a content player associated with a streaming media delivery service to present audiovisual content corresponding to a film, video clip, television show, or other content. Conventional filtering of audiovisual content (e.g., removal of objectionable audio clips and/or visual images) may use embedded filtering modules within the media application and/or rely on accessing audiovisual content via the API of the media application by using a key or other access credentials. However, conventional systems may lack a key, certificate, or other access credentials to access the audiovisual content presented by the media application because the media application has a locked API to screen audiovisual content. Additionally, in an enterprise network, conventional systems for monitoring content for employees may be insufficient to capture and filter objectionable content due to a locked API of various applications used by an employee.

Thus, embodiments of the present disclosure provide a system that can screen and monitor audiovisual content of content streams that may be encrypted and/or directed to a locked API of a media application. The system can detect and recognize visual images (e.g., semantics of a string of characters presented on a display, objects of an image, words, etc.) and/or audio clips from audiovisual content being presented. The system can interact with a plurality of content streams that are directed to different media applications, where each media application has its own locked API. The system can scrape the audiovisual content being presented on a display and invoke advanced content recognition so as to dynamically formulate a recommended audiovisual content filter action, such as replacement of a visual image, implement a content redirect, provide an audio replacement, inject a processor buffer instruction, or other content filter action. This system can be utilized as both a steward for content consumption from various applications (e.g., a social media platform and/or media delivery service) as well as compliance of screen-based interaction for a viewing user that operates in an enterprise network (e.g., an employee within a corporate enterprise).

In various embodiments, a media screening service can provide advanced content recognition that can use audiovisual content that has been scraped from a display ("scraped audiovisual content") in order to distinguish and identify visual images and artifacts (e.g., objects within audiovisual content, a scene within pre-recorded content, types of gestures, and/or categories of activity such as sports, films, etc.), audio objects (e.g., audio clips that include keywords, aggressive tones, inappropriate sounds, etc.), and textual recognition (e.g., semantic identification of text strings to establish and update a whitelist and/or blacklist). In various embodiments, a system can execute an audiovisual content identification application and/or service to identify the scraped audiovisual content and determine whether the scraped audiovisual content has objectionable content through semantic and/or syntactic matches from a data source. In some embodiments, a system can provide metric reporting tools so as to detect viewing user preferences, identify objection content trends across different media applications, and/or aggregate collective user feedback. A system can identify and match simultaneous consumption of the same audiovisual content on different devices and update dynamic filter settings so that an audiovisual content filter can be updated based on aggregated user feedback. The audiovisual content filter can allow for various filtering mechanisms, such as content replacement based on the viewing environment in which the audiovisual content is presented (e.g., varying the filter for work, home, family, etc.) and/or providing a replacement that textually explains the objectionable audiovisual content without presenting it.

In some embodiments, a system can be provided for detection and suppression of audiovisual content presented by a media application with a locked API, where the media application is associated with a social media platform and/or content. For example, a user may decide to access a media application having a locked API. A user may engage, invoke, and/or authorize a media screening service to be used to adaptively detect, screen, and suppress inappropriate or otherwise objectionable content. The media screening service can provide suggestions about the filter settings that can be configured to calibrate the system as to what is deemed appropriate and/or inappropriate for a particular viewing user. In some embodiments, a user can switch from a previous profile and/or setting to another profile and/or setting based on the viewing user. In some instances, the profile and/or setting can be automatically detected by the system based on where the viewing user is located and/or capturing of a viewing user's mood through audio and/or video input from a camera and/or microphone on user equipment.

In various embodiments, the system can implement one or more algorithms that produce semantic metadata (e.g., visual tags, audio keywords, perceived gestures through iterative analysis of a plurality of images) about audiovisual content presented by a media application (e.g., a social media application that can include a social feed that presents audiovisual content). In some embodiments, a media screening service may not necessarily always provide an audiovisual content filter in response to scraping and screening audiovisual content, but instead may use scraped audiovisual content to classify what is deemed explicit, inappropriate, or otherwise objectionable for a particular viewing user so as to establish a threshold, which may be assigned a flagged audiovisual setting value so as to indicate that certain audiovisual content is "flagged" and possibly inappropriate for a viewing user. In some embodiments, a media screening service can accumulate a plurality of instances of scraped audiovisual content from a variety of media applications (each having a locked API) to detect and identify new types of content that potentially could be a "seed" that becomes widely adopted and is potential for presenting objectionable audiovisual content (e.g., a "meme" that combines visual images with textual strings that otherwise may not be detected as being objectionable by conventional systems). In some instances, a user may access a media screening service to explicitly indicate and/or provide an identification of specific content that is deemed acceptable. In some embodiments, a media screening service can prompt a viewing user for feedback regarding audiovisual content that could be considered objectionable to some viewers but is not being filtered because the scraped audiovisual content is near a threshold, but does not meet or surpass the threshold, and in turn does not cause the system to provide an audiovisual content filter. If the user indicates that the audiovisual content should or should not have been filtered, then the media screening service can update the dynamic filter settings for the viewing user and act accordingly in a future content stream. In some embodiments, a media screening service can aggregate collective user input corresponding to one or more instances of audiovisual content, and based on the collective user input, the media screening service can establish a baseline value that can be varied for an individual viewing user according to one or more variables about the viewing user, such as but not limited to age, mood, viewing location, type of content, or other characteristics that can set a threshold by which to determine whether to provide an audiovisual content filter to the user equipment to filter flagged audiovisual content.

In various embodiments, when audiovisual content is determined to be objectionable for a particular viewing user, the system can prepare an audiovisual content filter that can include an instruction as to the type of filter that is to be employed, and audiovisual content filter data that can be used to implement the filter. For example, in some embodiments, an audiovisual content filter can include one or more instructions associated with an audio clip replacement, an audio clip cancellation, a content redirect where the audiovisual content being present is redirected to another content stream (e.g., another instance of content in a playlist and/or playback feed for the viewing user), a processor buffer injection that causes a processor of the user equipment to buffer and/or temporarily pause the rendering of the flagged audiovisual content so as to allow for a replacement audio clip and/or visual image to appear, a time jump that causes playback to skip ahead to another point along the timeline of the audiovisual content, an image overlay that prevents the flagged audiovisual content from being presented on a display, a visual distortion block that distorts and/or blurs a portion of the audiovisual content corresponding with the flagged portion, and/or a content summary block that blocks the audio and/or visual image that may be objectionable and provides an audio and/or visual summary as to why the content was blocked and/or a description of the content being block. In some embodiments, an audiovisual content filter may allow an audio portion of the flagged audiovisual content to be presented while a visual portion of the flagged audiovisual content is blocked or otherwise filtered. Similarly, in some embodiments, an audiovisual content filter may allow a visual portion of the flagged audiovisual content to be presented while an audio portion of the flagged audiovisual content is blocked or otherwise filtered. Instances of an audiovisual content filter can include audiovisual content filter data that can provide multi-dimensional data points (e.g., two or three dimensional data points) such that multi-dimensional renderings can be filtered (e.g., three-dimensional images within a virtual reality and/or augmented reality environment) and/or multi-channel audio portions of the audiovisual content can be filtered, replaced, and/or cancelled.

In some embodiments, the amount of audiovisual content filters that are provided to a user equipment for a particular viewing user may be tracked and/or logged so as to determine whether further actions should be taken, such as providing recommendations to an administrator and/or preemptively advising the viewing user that certain media applications may contain content streams that have objectionable audiovisual content prior to any audiovisual content being presented on a display. In some embodiments, a system can test and/or provide different audiovisual content filters to different user equipment for the same flagged audiovisual content. The system may detect viewing user reaction and update dynamic filter settings so as to adapt and employ future audiovisual filters that are amenable to a user. In some instances, a user may not provide feedback in response to an audiovisual content filter being employed on a display during playback of audiovisual content. The system may alert an administrator that an audiovisual content filter has been provided to a user equipment. In some embodiments, a media screening service may detect that a certain type of audiovisual content corresponds with a "stress" value (e.g., an action movie would correspond with a higher stress value than a romantic comedy) and based on a viewership time of audiovisual content with a high stress value, the media screening service may suggest and/or replace portions of the audiovisual content with content that has a lower stress value. In some embodiments, a content creator may repeatedly generate audiovisual content that is objectionable and causes a system to employ an audiovisual content filter. In some instances, a system can preemptively block the content stream from being provided to a user device and/or warn a viewing user that the audiovisual content is associated with a content creator that produces objectionable content. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, network servers, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for screening and selectively altering audiovisual content of a content stream when an application programming interface is locked will be described, according to an illustrative embodiment. The operating environment 100 shown in FIG. 1 includes a communications network ("network") 102, a client edge device ("CED") 104, a user equipment ("UE") 140 associated with a viewing user 130, a collective media screening system ("CMSS") 150, a plurality of users 132, a media content delivery server ("MCDS") 160, and a content stream 163. Briefly, it should be understood that the network 102 can include almost any type of computer networks as well as communications networks. In various embodiments, the network 102 can include one or more of a radio access network, an evolved packet core network, a core network, an IP-based network, a transport network, an optical transport network, a circuit switched network, a mobile Wide Area Network, a combination thereof, or the like. It is understood that the network 102 can communicate with one or more computing systems (e.g., any of the CED 104, the UE 140 the MCDS 160, and/or the CMSS 150) via one or more network access points (not shown) that can establish, provide, and maintain wireless and/or wired communication links. It is understood that one or more instances of a network access point may provide wired and/or wireless communicative coupling to any component of the operating environment 100. A network (e.g., the network 102) can include, but should not be limited to, one or more of a base transceiver station, a wireless router, a femtocell, an eNode B, a NodeB, a gNodeB (i.e., an access point that incorporates new radio access technology, such as LTE Advanced and other 5G technology), a multi-standard metro cell node, an optical network terminal, and/or other network nodes or combinations thereof that are capable of providing communication to and/or from the network 102. It should be understood that the examples provided are for illustration purposes only, and therefore should not be construed as limiting in any way.

In various embodiments, the network 102 can be operated, in whole or in part, by a communication service provider that enables various network services to be offered and provided to customers, such as one or more of the plurality of users 132 and/or the viewing user 130, via a computing system that may be provided by the communication service provider, such as but not limited to an instance of the CED 104 that communicatively couples to the UE 140 associated with the viewing user 130. The network 102 can host and/or be in communication with the CMSS 150 that can host, support, make available, and/or otherwise provide access to one or more instances of various network services, such as a media screening service ("MSS") 151 that can be implemented to screen and filter audiovisual content provided to the UE 140 by another network service, such as a media delivery service ("MDS") 161. It is understood that, in various embodiments, aspects of the CED 104 may be implemented within a user equipment (e.g., the UE 140) or vice versa. The embodiment of the operating environment 100 illustrated in FIG. 1 shows at least one network service (e.g., the MSS 151, the MDS 161, or any other service) being located and/or provided as a remote source from the CED 104 and/or the UE 140, however it is understood that this may not necessarily be the case in every embodiment. It is understood that, in some embodiments, an instance of the content stream 163, the audiovisual content 164, and/or any network service may be hosted and/or provided from local storage, a remote storage, or a combination thereof. In some embodiments, instances of the audiovisual content 164 and content interaction objects (e.g., menus, buttons, pointers, labels, or other aspects that can be made available on a screen display shown in FIGS. 2, 3A, and 3B) may be stored and/or retrieved from a local memory storage device (e.g., the memory 146 and/or the memory 112), according to various embodiments. It is also understood that, in some embodiments, the CED 104 and/or the UE 140 may be configured as and/or provide a virtual terminal such that the CED 104 and/or the UE 140 provides components for presentation and reception of audio input and/or output and visual input and/or output, where some and/or all data pertaining to audio and/or video (e.g., one or more instances of the audiovisual content 164 or any other audio data and/or video data) and some and/or all data pertaining to content interaction objects (e.g., menus, buttons, pointers, labels, or other aspects that can be made available on a screen display shown in FIGS. 2, 3A, and 3B) may be stored remotely from the CED 104 and/or the UE 140, and therefore are received by the CED 104 and/or the UE 140 from a remote source (e.g., one or more of the MCDS 160, the CMSS 150, or any other device connected to the network 102). In some embodiments, an instance of a screening agent (e.g., the screening agent 128) may be a virtual agent that is provided as part of the MSS 151, which may be considered a virtualized service in some embodiments. Additional examples of network services that can be supported and/or accessed by one or more of the network 102, the MCDS 160, the CMSS 150, the CED 104, and/or the UE 140 can include, but should not be limited to one or more of communication services, on-demand video content services, video-sharing services, media hosting services, social media services, social media platforms, augmented reality services, virtual reality services, aggregation analysis services for video content and video-sharing services, compute services, analysis services, storage services, routing services, switching services, relay services, virtualized services, combinations thereof, and/or other virtualized or non-virtualized network services. It is understood that the examples provided are for illustration purposes only, and therefore should not be construed as limiting in any way.

It should be understood that the term "service," as used herein, should be construed as one or more executing applications or any other computer-executable instructions that can provide a set of communication and/or network functions and operations on behalf of a particular machine (e.g., the MCDS 160, the CMSS 150, the CED 104, one or more network elements of the network 102, and/or the UE 140), and therefore the term "service" is not used, and shall not be construed or interpreted, to include or otherwise be directed to any abstract idea or any judicial exception that pertains to non-patentable subject matter. The network services can be used by a service provider, by third parties, and/or by customers via one or more of user equipment, servers, computing systems (whether virtualized and/or non-virtualized), and/or other computing elements according to the concepts and technologies discussed herein. Further discussion of embodiments of the network 102 is provided with respect to FIG. 6. It should be understood that the examples provided are for illustration purposes only, and therefore should not be construed as limiting in any way.

In various embodiments, the operating environment 100 can include one of more instances of the MCDS 160. In some embodiments, the MCDS 160 can be associated with at least a portion of the network 102, such as the portion which is operated by the communications service provider. In some embodiments, the MCDS 160 can be configured as a content hosting platform that supports the media delivery service 161 and a media content data source 162. In some embodiments, the media delivery service 161 can be developed and/or operated by a third party, such as but not limited to YOUTUBE Limited Liability Corporation that is a subsidiary of GOOGLE Incorporated in Mountain View, Calif., NETFLIX Incorporated, AMAZON VIDEO DIRECT that is a subsidiary of AMAZON DOT COM Incorporated, VIMEO Limited Liability Corporation, or any other audio and/or video content provider. In various embodiments, the media delivery service 161 can be accessed by various devices (e.g., the UE 140) so that a viewing user (e.g., the viewing user 130) can search for, and request delivery of, digital content that can be stored in one or more instances on the media content data source 162 and delivered via the network 102. The media delivery service 161 can include one or more applications that execute one or more processing units of the MCDS 160 to enable a user's device (e.g., the UE 140) to search for and access instances of digital media content stored in the media content data source 162 so that presentation of audiovisual content can occur on the user's device (e.g., the UE 140). In some embodiments, the media delivery service 161 may be considered a type of software as a service, a media hosting platform, a media website, or other network accessible application that provides digital media content to be provided to the UE 140, such as via the content stream 163 that includes audiovisual content 164, which is discussed in further detail below. It is understood that the media content data source 162 can include a computer storage medium that provides memory storage for various instances of digital media content for the media delivery service 161. In various embodiments, the MCDS 160 can include one or more instances of a processing unit and a memory unit that are configured in a physical and/or virtual medium so that computing resources can be scaled based on usage demand from devices requesting content from the media delivery service 161. The MCDS 160 can be configured substantially similar to a computer system 600, which is discussed below with respect to FIG. 6.

In various embodiments, the media delivery service 161 can provide one or more instances of the audiovisual content 164 that is packaged or otherwise included in one or more instances of the content stream 163. In various embodiments, instances of the content stream 163 can be provided to the UE 140 in response to a request for the audiovisual content 164, where the request can include a content identifier (e.g., the audiovisual content identifier 165) corresponding to the audiovisual content 164 being requested for presentation on the UE 140. As such, the media content data source 162 can include a plurality of instances of digital media content, each corresponding with a unique content identifier, such as an instance of the audiovisual content 164 corresponding to the audiovisual content identifier 165. The media delivery service 161 can receive the request from the UE 140 and retrieve an instance of the audiovisual content 164 based on the request indicating the audiovisual content identifier 165. The audiovisual content 164 can include one or more data packets that are configured to include, represent, and/or otherwise provide digital media through one or more digital images for visual playback on a device (e.g., the UE 140) and/or one or more audio files for audible playback via audio output on of a device (e.g., the UE 140). The content stream 163 can include the audiovisual content 164 by packaging instances of one or more data packets retrieved from the media content data source 162 based on the audiovisual content identifier 165. Examples of digital media content that can be presented by execution of one or more instances of the audiovisual content 164 can include, but should not be limited to, box-office films (e.g., feature movies), television shows, documentaries, user-generated content (e.g., videos, audio clips, moving images, and/or text that is uploaded to a social media platform and/or streaming service), podcasts, news conferences, or any other audio content and/or video content that can be presented to the viewing user 130 via a user device (e.g., the UE 140). Further discussion of the content stream 163 and the audiovisual content 164 will be provided below during a discussion of the UE 140. It should be understood that the examples provided are for illustration purposes only, and therefore should not be construed as limiting in any way.

The operating environment 100 can include one or more instances of the UE 140. The UE 140 can include a display 142, a processor 144, and a memory 146. The processor 144 can include one or more hardware components that perform computations to process data, and/or to execute computer-executable instructions of one or more application programs, operating systems, and/or other software, to provide, at least in part, presentation of video content and performance of one or more operations and functions described herein. In some embodiments, the memory 146 can include volatile and/or non-volatile memory implemented in any method or technology for storage of information such as computer-readable instructions, data structures, program modules, or other data disclosed herein. It is understood that, use of the term "memory" and "computer storage medium" (or variations thereof) in the claims does not include, and shall not be construed to include, a wave or a signal per se and/or communication media. Embodiments of a UE (e.g., the UE 140) can include, but should not be limited to, a mobile communications device, a desktop computer, a laptop computer, a tablet, a smart wearable device (e.g., smart-glasses, a smart watch, a fitness device), a smart home appliance (e.g., a smart refrigerator, a smart thermostat, a smart picture frame), a smart television, a smart dongle, a vehicle head unit, in-transit entertainment device, and/or any other computing systems that can send and/or receive data (e.g., the audiovisual content 164) with the network 102 for presentation to a viewing user (e.g., the viewing user 130). The UE 140 can include one or more communication interfaces by which to communicatively couple with the network 102 and/or the CED 104. For example, the UE 140 can include a transceiver that enables communicative coupling with the network 102 and/or CED 104. In some embodiments, the display 142 can communicatively couple with an audiovisual interface of the CED 104 (e.g., a high definition multimedia interface). In some embodiments, the UE 140 can communicatively couple with a network interface 108 of the CED 104 (e.g., wired communication port and/or a wireless radio transceiver of the CED 104, such as a transceiver 111). It is understood that the UE 140 can be configured substantially similar to, and thus include one or more components of, an embodiment of a UE discussed with respect to FIG. 7. Further discussion of an embodiment of a UE capable of implementing aspects of the operating environment 100 is provided below with respect to FIG. 7. It is understood that zero, one, or more than one instance of the UE 140 can be present within various embodiments of the operating environment 100. It should be understood that the examples provided are for illustration purposes only, and therefore should not be construed as limiting in any way.

In the operating environment 100 shown in FIG. 1, the memory 146 can include and store a media application 148 that can be executed by the processor 144. In various embodiments, the media application 148 can include a content player or any other set of computer-executable instructions that configures the processor 144 to cause the display 142 to present at least a portion of an instance of digital media content, such as the audiovisual content 164. In some embodiments, the media application 148 can be accessed via a website and therefore the media application 148 may be provided via a browser or other application such that in response to the UE 140 receiving a content stream that includes audiovisual content (e.g., the content stream 163 that includes the audiovisual content 164), the media application 148 can configure and instruct the processor 144 to present at least a portion of the audiovisual content 164 on the display 142 via a user interface so that the viewing user 130 may view (e.g., watch, listen, and/or interact with) the audiovisual content 164. In various embodiments, the audiovisual content 164 can configure the UE 140 to present visual images and/or produce audible sounds via the display 142 using one or more components discussed with respect to FIG. 7. It should be understood that the examples provided are for illustration purposes only, and therefore should not be construed as limiting in any way.

In various embodiments, the media application 148 is configured to include an application programming interface ("API") that is locked, such as a locked API 149. In various embodiments, an instance of the content stream 163 can be directed to an application having a locked API, such as the media application 148 having the locked API 149. The locked API 149 refers to a communication interface of the media application 148 that is configured to be accessed via the use of specific access credentials that are associated with the media application 148 (e.g., API access credentials 163A included in the content stream 163). As such, if the API access credentials 163A for the locked API 149 are not provided to the media application 148, then access to the media application 148 can be blocked and/or prevented. For example, the content stream 163 can include an instance of the API access credential 163A such that when the UE 140 receives the content stream 163 and the API access credentials 163A of the content stream 163 are provided to the locked API 149 of the media application 148, then the media application 148 permits the content stream 163 to be received via the locked API 149 for execution and presentation of the audiovisual content 164 on the display 142. In some embodiments, the content stream 163 can be encrypted such that any data included therein (e.g., the audiovisual content 164, audiovisual content identifier 165, the API access credentials 163A, etc.) cannot be intercepted, obtained, analyzed, or otherwise determined while the content stream 163 is being sent to the media application 148. In some embodiments, the content stream 163 may be configured exclusively for the media application 148 such that any other application besides the media application 148 (e.g., an instance of a screening agent 128 discussed below) cannot decrypt or unlock the content stream 163 in an attempt to access any information included therein (e.g., the audiovisual content 164, the audiovisual content identifier 165, and/or the API access credentials 163A) before the content stream 163 reaches the media application 148. As such, information associated and/or included with the content stream 163 (e.g., the audiovisual content 164) cannot be accessed and/or obtained via the locked API 149 by software that does not possess an instance of the API access credentials 163A (e.g., the screening agent 128 discussed below).

In various embodiments, the media application 148 can be configured to receive and execute the content stream 163 to present the audiovisual content 164 on the display 142 of the UE 140 so as to provide visual and/or audible output to the viewing user 130. When the audiovisual content 164 is presented on the display 142, the audiovisual content 164 can provide a timeline 166 that indicates a total length of content presentation. In some embodiments, the viewing user 130 can interact with the timeline 166 to fast forward, rewind, or otherwise indicate where and/or at what speed playback of the audiovisual content 164 should occur. In some embodiments, the timeline 166 can include an audiovisual start time indicator 166A, a current time indicator 166B, and an audiovisual end time indicator 166C. The audiovisual start time indicator 166A can provide a timestamp and/or a visual indicator corresponding to a starting or initial time at which presentation of the audiovisual content 164 can occur along the timeline 166. The audiovisual start time indicator 166A can be fixed along the timeline 166. The audiovisual end time indicator 166C can provide a timestamp and/or a visual indicator corresponding to an ending or final time at which presentation of the audiovisual content 164 will occur along the timeline 166. The audiovisual end time indicator 166C can be fixed along the timeline 166. The current time indicator 166B can provide a timestamp and/or a visual indicator that moves along the timeline 166 while playback and presentation of the audiovisual content 164 occurs and as such, an instance of a timestamp indicated by the current time indicator 166B can occur along the timeline 166 as early as the audiovisual start time indicator 166A, any point along the timeline 166 between the audiovisual start time indicator 166A and the audiovisual end time indicator 166C, or as late as the audiovisual end time indicator 166C. An example of the audiovisual start time indicator 166A, the current time indicator 166B, and the audiovisual end time indicator 166C is provided according to various embodiments shown in FIG. 2 and FIGS. 3A and 3B.

Figure 2:
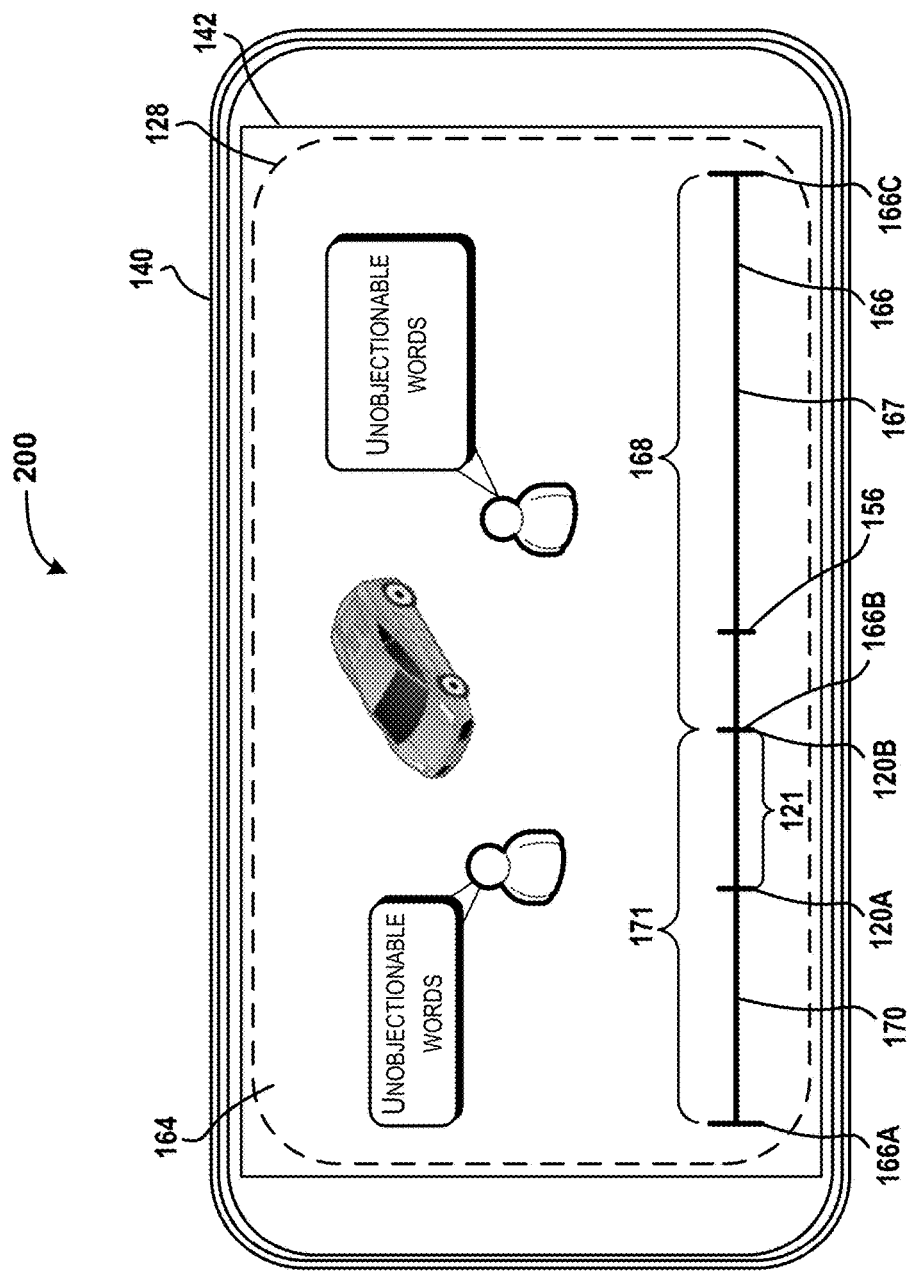
FIG. 2 is a user interface diagram showing an example screen display presenting audiovisual content by a media application having a locked application programming interface, according to an illustrative embodiment.
Figure 3A:
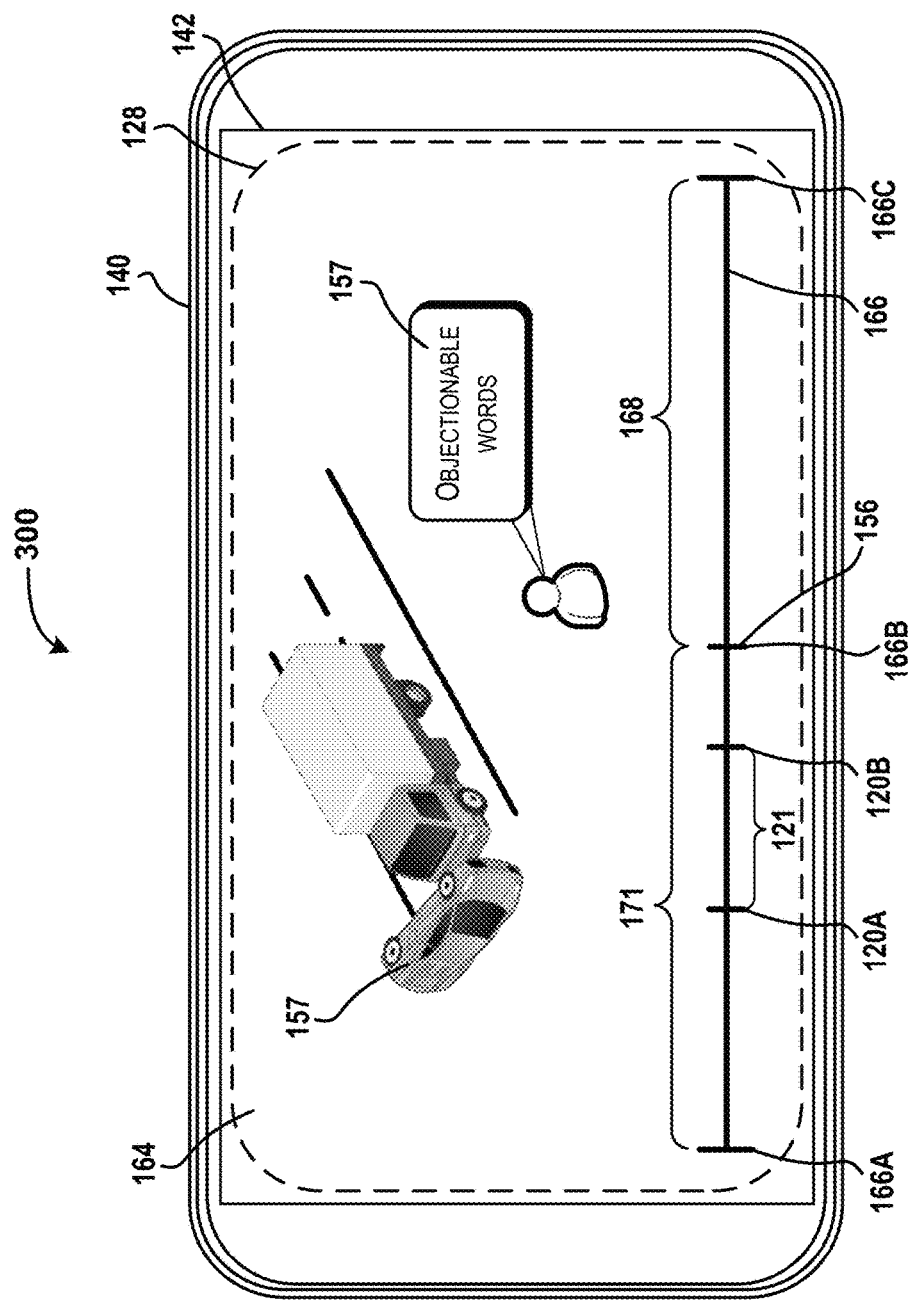
FIG. 3A is a user interface diagram showing an example screen display presenting flagged audiovisual content from a media application having a locked application programming interface, according to an illustrative embodiment.
Figure 3B:
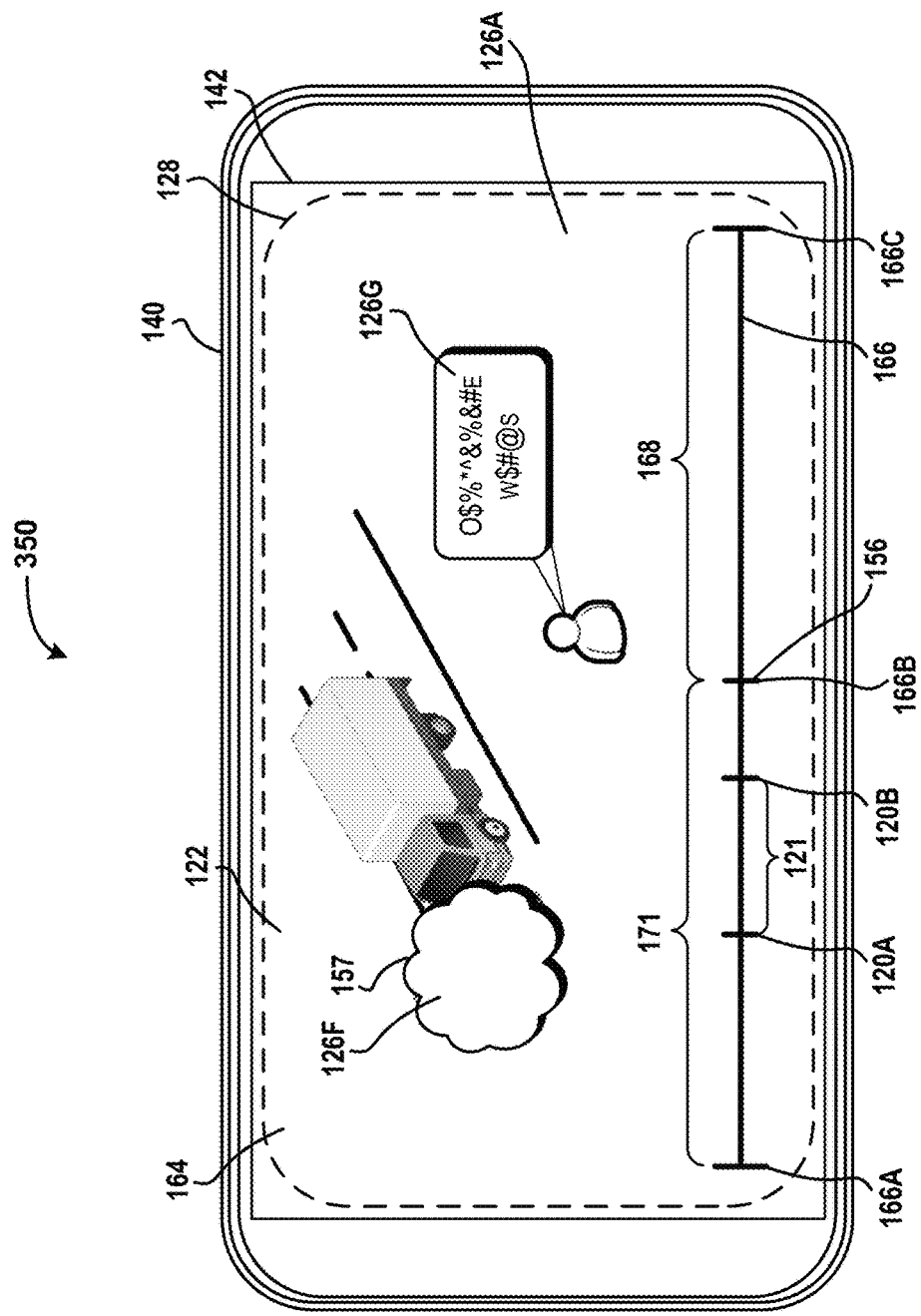
FIG. 3B is a user interface diagram showing an example screen display presenting an audiovisual content filter for the flagged audiovisual content from a media application having a locked application programming interface, according to an illustrative embodiment.

In various embodiments, the content stream 163 can be processed by the media application 148 such that the audiovisual content 164 is segmented into a presented portion 170 and a queued portion 167, such as shown and discussed with respect to FIG. 2 and FIGS. 3A and 3B. The presented portion 170 refers to the portion (or segment) of the audiovisual content 164 that has been, and is being, presented on the display 142. A presented portion time period 171 for the presented portion 170 corresponds with a first segment of the audiovisual content 164 along the timeline 166 that has been presented on the display 142 and begins at the audiovisual start time indicator 166A and ends at the current time indicator 166B. The queued portion 167 refers to the remaining portion (or second segment) of audiovisual content 164 that has not yet been provided to and/or presented on the display 142. The queued portion 167 can include data from the content stream 163 corresponding to an unpresented portion of the audiovisual content 164 that is in queue to be processed by the media application 148 and presented on the display 142. A queued portion time period 168 for the queued portion 167 corresponds with a second segment of the audiovisual content 164 along the timeline 166 that is between the current time indicator 166B and the audiovisual end time indicator 166C, such as shown in FIG. 2 and FIGS. 3A and 3B.

In the operating environment shown in FIG. 1, the memory 146 can include and store an instance of the screening agent 128. The screening agent 128 can be associated with an audiovisual screening application 114 that may be installed on the CED 104, which will be discussed in further detail below. The screening agent 128 can be configured as an applet, a plug-in, a script, or other set of computer-readable instructions that can execute on the UE 140 so as to scrape and retrieve audiovisual content (e.g., at least some of the presented portion 170 of the audiovisual content 164) directly from the display 142 while the audiovisual content 164 is being presented on the display 142 of the UE 140. In some embodiments, the screening agent 128 may have root access to the UE 140 such that the screening agent 128 can directly access the display 142. In other embodiments, the screening agent 128 may have received authorization from the viewing user 130 (or any other user associated with the UE 140) to access the display 142. The screening agent 128 (and an audiovisual screening application 114 discussed below) may not be authorized to have the API access credentials 163A, and therefore does not possess (and does not obtain) an instance of the API access credentials 163A associated with the locked API 149 of the media application 148. As such, the screening agent 128 (and the audiovisual screening application 114) cannot access the media application 148 via the locked API 149 and cannot analyze or otherwise collect information about the content stream 163 (including the audiovisual content 164) from the media application 148. Stated differently, the screening agent 128 may not be allowed or otherwise authorized to access the audiovisual content 164 directed to the media application 148 via the locked API 149 because the screening agent 128 and the audiovisual screening application 114 do not possess (nor can the screening agent 128 request) the API access credentials 163A that would allow access to the locked API 149 of the media application 148. Thus, observing and capturing the audiovisual content 164 can occur by bypassing the locked API 149 and accessing the display 142 directly. It should be understood that the examples provided are for illustration purposes only, and therefore should not be construed as limiting in any way.

The screening agent 128 can be communicatively coupled to the CED 104 so as to receive instructions and send data about activity on the UE 140, such as information being presented on the display 142. In some embodiments, the processor 144 can include one or more processing cores that can execute one or more process threads of data and information corresponding to an application on the UE 140, such as a media application process thread 144A that is associated with processing one or more portions of the audiovisual content 164 provided by the media application 148 for presentation of the audiovisual content 164 on the display 142. In some embodiments, the screening agent 128 may be authorized to access one or more process threads of the processor 144, and as such, may execute an instruction in accordance with an audiovisual content filter 122 that affects the media application process thread 144A, which will be discussed in further detail below. Further discussion of the screening agent 128 is provided below with respect to the CED 104.

The operating environment 100 shown in FIG. 1 can include one or more instances of the CED 104. The CED 104 can include one or more instances of an audiovisual interface 106, the network interface 108, a processor 110, the transceiver 111, and a memory 112. In some embodiments, the CED 104 can be configured as a wireless router, a dongle, a smart home assistant, a set-top box, a personal video recorder, or other network edge device that may be provided by a communication service provider. In some embodiments, the CED 104 may be configured as a stand-alone device that communicatively couples with the UE 140. In some embodiments, the CED 104 can act as an intermediary device between the network 102 and the UE 140 such that at least some network communications (e.g., the content stream 163 in an embodiment) are routed and/or relayed to and/or from the UE 140 via the CED 104. In some embodiments, the CED 104 may be configured as circuitry that is embedded within a housing of the UE 140. It should be understood that the examples provided are for illustration purposes only, and therefore should not be construed as limiting in any way.

In some embodiments, the audiovisual interface 106 can include a communication port or other communication interface that provides communicative coupling so as to send and/or receive data to and/or from the UE 140. For example, in some embodiments, the audiovisual interface 106 can include a high definition multimedia interface that can send and/or receive digital media content to and/or from the UE 140. In some embodiments, the screening agent 128 can send data that is captured and obtained from the display 142 (e.g., scraped audiovisual content 118) to the CED 104 via the audiovisual interface 106. The network interface 108 can provide wired and/or wireless communicative coupling with other devices (e.g., the UE 140 and/or the network 102). In some embodiments, the network interface 108 can include a communication port and/or a channel that is established and provided by the transceiver 111. The transceiver 111 can include a radio transceiver or other communication transceiver by which information can be provided to and/or from the CED 104. The processor 110 can include a processing unit, which may be configured to perform operations based on computer-readable instructions, such as one or more application stored in the memory 112. For example, one or more instance of the processor 110 can include one or more central processing units ("CPUs") configured with one or more processing cores, one or more graphics processing unit ("GPU") configured to accelerate operations performed by one or more CPUs, and/or one or more systems on a chip ("SOC") to perform computations to process data, and/or to execute computer-executable instructions of one or more application programs, operating systems, and/or other software that may or may not include instructions particular to graphics and/or communications computations. Further discussion of embodiments of the processor 110 as a processing unit and/or compute resources can be found with respect to FIG. 6. The processor 110 can include one or more hardware components that perform computations to process data, and/or to execute computer-executable instructions of one or more application programs, operating systems, and/or other software, to provide, at least in part, presentation of audiovisual content and performance of one or more operations and functions described herein. The processor 110 can be configured substantially similar to one or more embodiments discussed with respect to a processor shown in FIG. 7 and/or a processing unit shown in FIG. 6 discussed below.

In some embodiments, the memory 112 can include volatile and/or non-volatile memory implemented in any method or technology for storage of information such as computer-readable instructions, data structures, software program modules, or other data disclosed herein. It is understood that, use of the term "memory" and "computer storage medium" (or variations thereof) in the claims does not include, and shall not be construed to include, a wave or a signal per se and/or communication media. The memory 112 can include a computer storage device that is configured substantially similar to memory discussed with respect to FIG. 6. In various embodiments, the memory 112 can include and store an audiovisual screening application, such as the audiovisual screening application 114. The audiovisual screening application 114 can be associated with the media screening service 151 provided by a communication service provider. The audiovisual screening application 114 can be associated and in communication with the screening agent 128. The audiovisual screening application 114 can provide instructions to the screening agent 128 so that operations are performed on the UE 140 in accordance with the content filtering for the media screening service 151. The screening agent 128 can be authorized to access the display 142 independently from the media application 148 such that the screening agent 128 can observe and capture information being presented on the display 142 by the media application 148 while the media application 148 provides one or more portions of the audiovisual content 164 to the display 142. As such, the audiovisual screening application 114 can activate or otherwise instruct the screening agent 128 to scrape the audiovisual content 164 that is being presented on the display 142 by the media application 148 executing on the UE 140. As used herein, the term "scrape" and/or "scraping" refers to and includes observing and capturing the audiovisual content 164 that is being presented by the display 142, specifically at least some of the presented portion 170 of the audiovisual content 164 so as to generate an instance of scraped audiovisual content 118. Therefore, when the audiovisual screening application 114 scrapes the display 142 via use of the screening agent 128, an instance of the scraped audiovisual content 118 is created and stored in the memory 112. In some embodiments, as the screening agent 128 scrapes the display 142 to capture the audiovisual content 164 being presented, the scraped audiovisual content 118 can be transferred from the UE 140 to the CED 104 via the audiovisual interface 106 that communicatively couples the display 142 to the CED 104.

The audiovisual screening application 114 can assign a scraped time period identifier 120 to the scraped audiovisual content 118 so as to indicate a time period (e.g., a scraped time period 121) along the timeline 166 over which scraping of the audiovisual content 164 occurred. The scraped time period identifier 120 can include a scraping start time marker 120A and a scraping end time marker 120B. The scraping start time marker 120A can indicate a timestamp marking the beginning of the scraped time period 121 along the timeline 166 where the scraping began, and thus corresponds with the beginning of the scraped audiovisual content 118. The scraping end time marker 120B can indicate a timestamp marking the end of the scraped time period 121 along the timeline 166 where the scraping ends, and thus corresponds with the end of the scraped audiovisual content 118.

In various embodiments, the audiovisual screening application 114 can create an instance of an audiovisual screening package 116 that can include the scraped audiovisual content 118 and the scraped time period identifier 120 corresponding to the scraped time period 121. An example of the scraped time period 121 is shown in FIGS. 2, 3A, and 3B, according to an embodiment. Because the audiovisual screening application 114 and/or the screening agent 128 do not have access to the audiovisual content 164 via the locked API 149 of the media application 148, the audiovisual screening application 114 may not be able to receive and/or request the audiovisual content identifier 165 from the media application 148 in order to determine whether the audiovisual content 164 includes objectionable material that can be filtered by the audiovisual screening application 114. To determine whether the audiovisual content 164 of the content stream 163 includes flagged audiovisual content (i.e., one or more instances of visual images and/or audio clips of the audiovisual content 164 presented on the display 142 that could be considered objectionable to the viewing user 130), the identity of the audiovisual content 164 is determined without accessing the locked API 149. The audiovisual screening application 114 may perform operations to determine the identity of the audiovisual content 164 by obtaining the audiovisual content identifier 165 that is included in the content stream 163, but cannot be obtained by the screening agent 128 and/or the audiovisual screening application 114 directly from the media application 148 due to locked API 149, thereby rendering the audiovisual content 164 and any information about the content stream 163 inaccessible via the locked API 149. In various embodiments, the audiovisual screening application 114 can determine and obtain the audiovisual content identifier 165 for the audiovisual content 164 without accessing the locked API 149 based on creating and using the scraped audiovisual content 118 while the locked API 149 remains locked and inaccessible to the audiovisual screening application 114 and the screening agent 128. To determine and obtain the audiovisual content identifier 165 based on the scraped audiovisual content 118, the audiovisual screening application 114 can provide the audiovisual screening package 116 to the media screening service 151. The scraped audiovisual content 118 can be used to determine whether an upcoming, unpresented portion of the audiovisual content 164 (e.g., referred to as the queued portion 167 of the audiovisual content 164) includes flagged audiovisual content. It should be understood that the examples provided are for illustration purposes only, and therefore should not be construed as limiting in any way.

The operating environment 100 shown in FIG. 1 can include one or more instances of the CMSS 150. In various embodiments, the CMSS 150 can be configured as one or more servers or other computer systems, such as a computer system shown and discussed with respect to FIG. 6. The CMSS 150 can include physical network functions (e.g., processing units and memory) that host and provide the media screening service 151 for one or more user devices, such as the UE 140. In some embodiments, the CMSS 150 and/or the media screening service 151 can be included as part of the network 102 and/or stored in the memory 112 of the CED 104. It should be understood that the examples provided are for illustration purposes only, and therefore should not be construed as limiting in any way. In various embodiments an audiovisual content identification application 152 of the media screening service 151 can receive the scraped audiovisual content 118, which may be included within the audiovisual screening package 116. The audiovisual content identification application 152 can provide image recognition (e.g., via optical character recognition, pattern matching, gradient matching, etc.) and/or audio recognition (e.g., via audio fingerprint detection and recognition) for the scraped audiovisual content 118 in order to identify the audiovisual content captured by the scraped audiovisual content 118. In some embodiments, the audiovisual content identification application 152 can extract the scraped audiovisual content 118 from the audiovisual screening package 116, identify the scraped time period identifier 120 that identifies the scraped time period 121, access the media content data source 162 and compare audio and/or visual data from the scraped audiovisual content 118 to one or more instances of various media content stored within the media content data source 162 based on the scraped time period identifier 120 so as to match and determine the identity of the audiovisual content 164 being presented on the display 142. For example, the audiovisual content identification application 152 may compare portions of media content (stored in the media content data source 162) that coincide with the timestamps from the scraped time period 121 indicated by the scraped time period identifier 120 (e.g., the scraping start time marker 120A and the scraping end time marker 120B) so as to perform image and/or audio recognition on the scraped audiovisual content 118. By the audiovisual screening application 114 including the scraped time period identifier 120 in the audiovisual screening package 116 and by isolating the comparison of the scraped audiovisual content 118 to select segments of the media content from the media content data source 162 that coincide with scraped time period identifier 120 of the scraped audiovisual content 118, the processor utilization time may decrease and the time for accessing memory storage (e.g., the media content data source 162) may also decrease, thereby enabling improved functionality of the media screening service 151 and higher hardware resource utilization efficiency.

In response to the audiovisual content identification application 152 detecting a match between the scraped audiovisual content 118 and the media content from the media content data source 162 over the scraped time period 121 indicated by the scraped time period identifier 120, the audiovisual content identification application 152 can obtain the corresponding identifier for the media content that indicated a match. For example, the audiovisual content identification application 152 can detect that an instance of the audiovisual content 164 that is stored on the media content data source 162 matches the scraped audiovisual content 118 over the scraped time period identifier 120, and as such, the audiovisual content identification application 152 can obtain the audiovisual content identifier 165 that corresponds with the audiovisual content 164 (and therefore also the scraped audiovisual content 118).

In various embodiments, once the audiovisual content identification application 152 determines that the audiovisual content identifier 165 corresponds with the scraped audiovisual content 118, thereby indicating that the scraped audiovisual content 118 corresponds with the audiovisual content 164, the audiovisual content identifier 165 can be provided to the audiovisual screening application 114. The audiovisual screening application 114 can access an audiovisual content map 153. The audiovisual content map 153 may be stored in the memory 112, in a memory storage device of the CMSS 150, and/or another accessible location via the network 102. The audiovisual content map 153 can map and point to an instance of an audiovisual content profile that is associated with an instance of audiovisual content available from the media content data source 162, such as the audiovisual content profile 154 that is associated with the audiovisual content 164 having the audiovisual content identifier 165. For example, using the audiovisual content identifier 165 that was determined based on the scraped audiovisual content 118, the audiovisual content map 153 can point to the audiovisual content profile 154 which includes information pertaining to possible objectionable material or other content that could be filtered during playback of the audiovisual content 164. In some embodiments, the audiovisual content profile 154 can be configured as a data table or other searchable index that includes information about the audiovisual content 164, specifically indicating whether objectionable visual images and/or audio clips are and/or could be present within the audiovisual content 164.

In some embodiments, the audiovisual content profile 154 can be based on data that is received from one or more users that have viewed the audiovisual content 164 and provided feedback and/or data that is determined based on actions and/or behaviors of the one or more users that have viewed and/or commented about the audiovisual content 164. For example, the CMSS 150 may detect, receive, and/or obtain collective user input 133 from a plurality of users 132 that have viewed, commented, interacted, and/or reacted to the audiovisual content 164 in various forms. For example, one or more users from the plurality of users 132 may have viewed the audiovisual content 164 and provided specific feedback about objectionable material to the media delivery service 161, where the feedback can be used as a trigger in determining whether portions of the audiovisual content 164 should be filtered, as further discussed below. In other instances, one or more users may not have commented about the audiovisual content 164 on a social media platform or other media service, and the comments may be included in the collective user input 133 so that the media screening service 151 can compile and configure the audiovisual content profile 154. It should be understood that the examples provided are for illustration purposes only, and therefore should not be construed as limiting in any way.

In various embodiments, the audiovisual content profile 154 may be assigned to the audiovisual content 164, such as by including a reference to the audiovisual content identifier 165. In some embodiments, the audiovisual content profile 154 may not be assigned to a specific user or account, but instead be available for reference and use for content filtering on one or more UE's for a variety of viewing users that may or may not be associated with each other. In other embodiments, the audiovisual content profile 154 may be generated specifically for a customer of the communication service provider, a customer account, a specific UE (e.g., the UE 140), or other designated devices. It should be understood that the examples provided are for illustration purposes only, and therefore should not be construed as limiting in any way.

The audiovisual content profile 154 can include an audiovisual content flag 155, one or more instance of a flagged time indicator 156, one or more instance of flagged audiovisual content 157, one or more instance of a flagged audiovisual setting value 158, and one or more instance of flagged content object data 159. The audiovisual content flag 155 can indicate the presence of an instance of flagged audiovisual content 157 that corresponds with an instance of the flagged time indicator 156. As used herein, the phrase "flagged audiovisual content" (or variations thereof, such as "flagged content") refers to and includes an instance of data from the audiovisual content 164 that provides presentation of a visual image and/or audio clip which is (or could be) designated to be objectionable to one or more users (e.g., the viewing user 130 and/or one or more use of the plurality of users 132) and therefore may trigger the use of an audiovisual content filter discussed below. As such, in some embodiments, a portion of the audiovisual content 164 can be designated in the audiovisual content profile 154 as an instance of flagged audiovisual content 157.

In various embodiments, when an instance of the flagged audiovisual content 157 is present within a portion of the audiovisual content 164, the audiovisual content profile 154 can store, reference, or otherwise include an instance of the audiovisual content flag 155 that is associated with the flagged audiovisual content 157. As such, the audiovisual screening application 114 (or another application or service, such as the media screening service 151) can access the audiovisual content profile 154 to determine whether one or more instances of the audiovisual content flag 155 exist for the audiovisual content 164. Each instance of the audiovisual content flag 155 and the flagged audiovisual content 157 are associated with an instance of the flagged time indicator 156 that defines a timestamp, time period, or other time indicator as to where along the timeline 166 the flagged audiovisual content 157 occurs, such as shown in FIG. 2 and FIGS. 3A-3B. The flagged time indicator 156 can correspond with either the queued portion 167 of the audiovisual content 164 or the presented portion 170 of the audiovisual content 164.

By way of example, in some embodiments, the audiovisual screening application 114 may determine that an instance of the audiovisual content flag 155 exists within the audiovisual content profile 154 for the audiovisual content 164, and that the flagged time indicator 156 (associated with the audiovisual content flag 155) corresponds with the queued portion 167 of the audiovisual content 164 (e.g., a time indicated by the flagged time indicator 156 lies within the queued portion time period 168 that has not yet been presented on the display 142 but is in queue to be presented) so as to indicate that flagged audiovisual content 157 is in queue to be presented on the display 142. Therefore, when the flagged time indicator 156 corresponds with the queued portion 167 of the audiovisual content 164, then the audiovisual screening application 114 can determine that the flagged audiovisual content 157 is in queue to be presented, but has not yet been presented, on the display 142, and in turn can trigger further analysis as to whether to filter to the flagged audiovisual content 157. For each instance of the audiovisual content flag 155, the audiovisual screening application 114 and/or the media screening service 151 can determine whether an instance of an audiovisual content filter 122 should be generated for the corresponding instance of the flagged audiovisual content 157. It should be understood that the examples provided are for illustration purposes only, and therefore should not be construed as limiting in any way.

Each instance of the flagged audiovisual content 157 can correspond with a flagged audiovisual setting value 158 and an instance of flagged content object data 159. The flagged audiovisual setting value 158 can be used to compare against one or more parameters, values, rules, or other definitions from the dynamic filter settings 131 associated with the UE 140 and/or viewing user 130. The flagged audiovisual content 157 can be associated with a visual image and/or an audio clip of the audiovisual content 164, and therefore the audiovisual setting value 158 can define a comparable value associated with the flagged audiovisual content 157 by which to determine whether a visual image and/or audio clip should be filtered. For example, in an embodiment, the audiovisual screening application 114 and/or the media screening service 151 can compare the flagged audiovisual setting value 158 against one or more limit from the dynamic filter settings 131 that relate to the flagged audiovisual content 157. Further discussion of the dynamic filter settings 131 is provided below. If the flagged audiovisual setting value 158 is within a defined percentage of a limit (e.g., within three percent of a threshold value) of the dynamic filter settings 131 and/or meets or exceeds a limit of the dynamic filter settings 131, then the audiovisual screening application 114 and/or the media screening service 151 can invoke or otherwise command that an instance of an audiovisual content filter should be employed. It is understood that, in some embodiments, the media screening service 151 may instantiate an instance of an audiovisual content flag (e.g., the audiovisual content flag 155) based on a defined number of feedback instances where user input (e.g., the collective user input and/or the viewing user response 134) indicates that a particular presented portion 170 of the audiovisual content 164 should or should not have been flagged or otherwise filtered (e.g., via a fixed or dynamic number of instances of input that correspond with a specific time indicator along the timeline 166, where the input indicates that audiovisual content 164 should have been flagged, thereby causing the media screening service 151 and/or the audiovisual screening application 114 to automatically instantiate an instance of the audiovisual content flag 155 and assign a flagged audiovisual setting value 158 within the audiovisual content profile 154). By this, aspects of the CMSS 150 can dynamically adjust what audiovisual content should be allowed to be presented and/or filtered based on the severity of the particular flagged audiovisual content (as indicated by a corresponding flagged audiovisual setting value), while also being able to dynamically adjust the dynamic filter settings 131 for a particular viewing user and/or user equipment. In some embodiments, an audiovisual content flag 155 may be dynamically removed after a defined number of inputs from one or more users indicating that the corresponding audiovisual content should not be filtered or otherwise censored due to not being objectionable. Similarly, aspects of the dynamic filter settings 131 for a particular user (e.g., the viewing user 130) may be adjusted and/or modified based on an instance of an audiovisual content flag being instantiated and/or removed from an audiovisual content profile 154. It should be understood that the examples provided are for illustration purposes only, and therefore should not be construed as limiting in any way.

In some embodiments, when an audiovisual content filter is to be employed (e.g., the audiovisual content filter 122), the audiovisual screening application 114 and/or the media screening service 151 can pull, reference, or otherwise use an instance of flagged content object data 159 that is associated with the flagged audiovisual content 157, the audiovisual content flag 155, and the flagged time indicator 156. The flagged content object data 159 can be used to create an instance of an audiovisual content filter (e.g., the audiovisual content filter 122). The flagged content object data 159 can include image data and/or audio data pertaining to parameters of the flagged audiovisual content 157, such as pixel location (e.g., in two or more coordinates) pertaining to where visual images of the flagged audiovisual content 157 are presented on the display 142, audio clip duration and/or sound frequencies corresponding to the flagged audiovisual content 157, one or more strings providing descriptions of the flagged audiovisual content 157, or any other data that can be used to create, invoke, employ, and/or provide an instance of an audiovisual content filter 122, which is discussed below in further detail following as discussion of the dynamic filter settings 131.

In various embodiments, the media screening service 151 can include one or more instances of dynamic filter settings 131 that are associated with a specific customer of the communication service provider, a customer account, a specific UE (e.g., the UE 140), or other designated devices. For example, an instance of the dynamic filter settings 131 can be assigned to the UE 140 and/or the viewing user 130 that is associated with the UE 140. The dynamic filter settings 131 can include parameters, thresholds, rules or other values that define, designate and/or pertain to a limit by which to determine whether an audiovisual content filter should be employed. For example, the dynamic filter settings 131 can include one or more parameters that establish categories of audiovisual content that are allowed and/or not allowed to be presented on the UE 140 (e.g., horror, adult content, certain comedy shows, types of chat rooms, types of video games, etc.). The dynamic filter settings 131 can include thresholds that define a value by which to compare against the audiovisual content profile 154, such as a threshold value for the amount of objectionable words presented (visually and/or audibly) on the UE 140, a value corresponding to an amount of viewing time that is allowed for certain applications and/or users (e.g., the media application 148 and/or the viewing user 130), or other values that may be defined and designated based on user input and/or dynamically independent of direct user input. The dynamic filter settings 131 can include rules, such as the type of audiovisual content filter that can be invoked and/or employed when flagged audiovisual content is present within the audiovisual content. For example, when one or more words in the queued portion 167 of the audiovisual content 164 are present and are in queue to be presented (visually and/or audibly) on the UE 140, then the dynamic filter settings 131 may indicate whether such words, phrase, idioms, or the like are allowed and if not, indicate that an audiovisual content filter should be generated with a specific instruction, such as discussed below in further detail. It should be understood that the examples provided are for illustration purposes only, and therefore should not be construed as limiting in any way.

In some embodiments, an instance of dynamic filter settings 131 can be created, configured, adapted, and/or updated based on a response and/or reaction from one or more users associated with the UE 140 (e.g., the viewing user 130). In some embodiments, the audiovisual screening application 114, the screening agent 128, and/or the media screening service 151 can enable the viewing user 130 to configure, set, and/or adjust one or more parameters of the dynamic filter settings 131 via a viewing user response 134. In some embodiments, the screening agent 128 can detect a reaction from the viewing user 130 (and/or other users such as one of the plurality of users 132 that may view the audiovisual content 164) based on what is being presented on the display 142, such as the audiovisual content 164 and/or an instance of an audiovisual content filter. In some embodiments, the viewing user 130 can be associated with a viewing user response 134 that is detected by the screening agent 128 and/or received as input from the viewing user 130. For example, if the viewing user 130 (or any other user that can view the display 142) reacts in a certain manner to the audiovisual content 164 being presented and/or to an instance of an audiovisual content filter 122 that is provided to filter flagged audiovisual content, the screening agent 128 may detect the user reaction (e.g., via a video capture device and/or audio capture device of the UE 140) and/or receive the user reaction (e.g., based on direct user input to the UE 140, such as through a remote control device), and in response to detecting and/or receiving the reaction, can generate a message that includes the viewing user response 134, which in turn can be relayed to the audiovisual screening application 114 and/or the media screening service 151. The viewing user response 134 can be used to update, modify, alter, (re)configure, and/or define one or more settings within the dynamic filter settings 131 associated with the UE 140 and/or the viewing user 130 so as to customize the screening and filtering service provided to the viewing user 130. It should be understood that the examples provided are for illustration purposes only, and therefore should not be construed as limiting in any way.

In various embodiments, the audiovisual screening application 114 can prepare an instance of the audiovisual content filter 122 for the flagged audiovisual content 157 so as to filter the flagged audiovisual content that is in queue to be presented on the display 142. In some embodiments, the audiovisual screening application 114 may prepare an instance of the audiovisual content filter 122 in response to determining that the audiovisual content 164 of the content stream 163 includes the flagged audiovisual content 157, such as based on the audiovisual content flag 155 for the flagged audiovisual content 157 having an instance of the flagged time indicator 156 that corresponds with the queued portion 167 of the audiovisual content 164 that has not yet been presented on the display 142. In various embodiments, objectionable content that is presented in the form of visual images and/or audio clips from the audiovisual content 164 can be filtered via one or more instance of the audiovisual content filter 122. The audiovisual content filter 122 can include audiovisual content filter data 124 that provides the screening agent 128 with information as to when the flagged audiovisual content 157 of the audiovisual content 164 will occur along the timeline 166, what portion of the display 142 to filter, and/or the duration or sound that should be filtered by the audiovisual content filter 122. In some embodiments, the flagged content object data 159 can be used to create an instance of the audiovisual content filter data 124 such that the screening agent 128 is instructed to provide visual filtering and/or audio filtering at a point along the timeline corresponding to the flagged time indicator 156 so that the flagged audiovisual content 157 is filtered, masked, blocked, or otherwise not presented to the viewing user 130 by the display 142 of the UE 140.

In various embodiments, the audiovisual content filter 122 can include one or more filtering instruction that can prevent the flagged audiovisual content 157 of the audiovisual content 164 from being presented by the display 142. For example, the audiovisual content filter 122 can include one or more of an audio clip replacement instruction 126A, an audio clip cancellation instruction 126B, a content redirect instruction 126C, a processor buffer instruction 126D, a time jump instruction 126E, an instruction for an image overlay block 126F, an instruction for a visual distortion block 126G, or an instruction for a content summary block 126H. The audio clip replacement instruction 126A can instruct the screening agent 128 to replace an audio clip (i.e., a portion of audible output presented by the display 142) associated with the flagged audiovisual content 157 with a replacement audio clip, which may be defined by the audiovisual content filter data 124. Thus, when the screening agent 128 executes the audio clip replacement instruction 126A, the UE 140 presents a replacement audio clip on the display 142 (at a time along the timeline 166 corresponding to the flagged time indicator 156) instead of audio from the flagged audiovisual content 157. The audio clip cancellation instruction 126B can instruct the screening agent 128 to mute, cancel, and/or selectively block audio output from the display 142 corresponding to the flagged audiovisual content 157, where the portion of audio that is to be cancelled can be defined or otherwise indicated by the audiovisual content filter data 124. The content redirect instruction 126C can instruct the screening agent 128 to present alternate audiovisual content in place of the audiovisual content 164 so as to no longer present the audiovisual content 164 and instead redirect the processor 144 to execute the alternate audiovisual content that can be defined and/or provided by the audiovisual content filter data 124.

The processor buffer instruction 126D can instruct the screening agent 128 to inject a buffer instruction into a processing thread of the processor 144 so as to invoke a pause or buffering action that temporarily ceases the presentation on the display 142, which in turn skips the presentation of the flagged audiovisual content 157 so as to effectively filter and cause the flagged audiovisual content 157 to not be presented. For example, in some embodiments, the processor 144 can include one or more processing cores that can execute one or more process threads for data and information corresponding to an application on the UE 140, such as the media application process thread 144A that is associated with processing data of the content stream 163 to provide to the display 142 for presentation of the audiovisual content 164 via the display 142. The screening agent 128 can invoke the processor buffer instruction 126D at a time along the timeline 166 corresponding to the flagged time indicator 156 to cause an interruption to the media application process thread 144A so as to prevent the flagged audiovisual content 157 from being processed and presented on the display 142. The time jump instruction 126E can instruct the screening agent 128 to jump or skip past the time along the timeline 166 corresponding to the flagged time indicator 156 such that the flagged audiovisual content 157 is not presented on the display 142. The instruction for an image overlay block 126F can command the screening agent 128 to provide a visual image that is overlaid on the flagged audiovisual content 157 according to the audiovisual content filter data 124, such as shown in FIG. 3B. The instruction for a visual distortion block 126G can command the screening agent 128 to distort and/or blur a visual image portion corresponding to the flagged audiovisual content 157 at a time along the timeline 166 corresponding to the flagged time indicator 156 such that the flagged audiovisual content 157 is filtered or otherwise obscured on the display 142. The instruction for a content summary block 126H can instruct the screening agent 128 to provide a text box, block, or other visual and/or audible representation of describing the flagged audiovisual content 157 and/or describing why the flagged audiovisual content 157 is being filtered or otherwise not presented. It is understood that filtering through the use of the audiovisual content filter 122 can occur while the locked API 149 remains locked. It should be understood that the examples provided are for illustration purposes only, and therefore should not be construed as limiting in any way.

In various embodiments, the audiovisual screening application 114 can provide the audiovisual content filter 122 to the UE 140 such that the audiovisual content filter 122 can filter the flagged audiovisual content provided by media application 148. For example, the audiovisual screening application 114 can send the audiovisual content filter 122 to the screening agent 128, which in turn can execute one or more instructions and/or the audiovisual content filter data 124 so that the audiovisual content filter 122 can filter the flagged audiovisual content 157 at the time along the timeline 166 corresponding to the flagged time indicator 156, where the filtering occurs without accessing the locked API 149. In some embodiments, if the audiovisual content filter 122 visually filters the flagged audiovisual content 157 (e.g., via the image overlay block 126F, the visual distortion block 126G, and/or the content summary block 126H), then the audiovisual screening application 114 can remove or otherwise cease presentation of the audiovisual content filter 122 so as to resume presentation of the audiovisual content 164 without any filter. It should be understood that the examples provided are for illustration purposes only, and therefore should not be construed as limiting in any way.

FIG. 1 illustrates the operating environment 100 having one instance the network 102, the CED 104, the audiovisual interface 106, the network interface 108, the processor 110, the transceiver 111, the memory 112, the audiovisual screening application 114, the audiovisual screening package 116, the scraped audiovisual content 118, the scraped time period identifier 120, the scraping start time marker 120A, the scraping end time marker 120B, the scraped time period 121, the audiovisual content filter 122, the audiovisual content filter data 124, the audio clip replacement instruction 126A, the audio clip cancellation instruction 126B, the content redirect instruction 126C, the processor buffer instruction 126D, the time jump instruction 126E, the image overlay block 126F, the visual distortion block 126G, the content summary block 126H, the viewing user 130, the plurality of users 132, the collective user input 133, the viewing user response 134, the UE 140, the display 142, the processor 144, the media application process thread 144A, the memory 146, the media application 148, the locked API 149, the screening agent 128, the CMSS 150, the media screening service 151, the audiovisual content identification application 152, the audiovisual content map 153, the dynamic filter settings 131, the audiovisual content profile 154, the audiovisual content flag 155, the flagged time indicator 156, the flagged audiovisual content 157, the flagged audiovisual setting value 158, the flagged content object data 159, the MCDS 160, the media delivery service 161, the media content data source 162, the content stream 163, the API access credentials 163A, the audiovisual content 164, the audiovisual content identifier 165, the timeline 166, the audiovisual start time indicator 166A, the current time indicator 166B, the audiovisual end time indicator 166C, the queued portion 167, the queued portion time period 168, the presented portion 170, and the presented portion time period 171. It should be understood, however, that some implementations of the operating environment 100 can include zero, one, or more than one instances of the above listed elements of the operating environment 100 shown in FIG. 1. As such, the illustrated embodiment of the operating environment 100 is understood to be illustrative and should not be construed as being limiting in any way.

Turning now to FIG. 2 with continued reference to FIG. 1, a user interface diagram showing an example of a screen display 200 is provided according to an illustrative embodiment. The screen display 200 illustrates an example of presenting an instance of the audiovisual content 164 by the media application 148 that has the locked API 149, according to an embodiment. In an embodiment, the UE 140 can execute the media application 148 to present the audiovisual content 164 via the display 142. It is understood that the audiovisual content 164 may include presentation of visual images and/or audio clips that provide audible sounds via the display 142. By way of example, in an embodiment, presentation of the audiovisual content 164 can span along various points of the timeline 166. The timeline 166 can include the current time indicator 166B which moves along the timeline 166 (e.g., from the audiovisual start time indicator 166A towards the audiovisual end time indicator 166C) as the audiovisual content 164 is played and presented on the display 142. In some embodiments, the current time indicator 166B can be configured to provide a timestamp (e.g., formatted in hours, minutes, and seconds). It should be understood that the examples provided are for illustration purposes only, and therefore should not be construed as limiting in any way.

In various embodiments, the visual images and/or audio clip that is currently being presented on the display 142 corresponds with the presented portion 170 of the audiovisual content 164 and the presented portion time period 171 which spans from the audiovisual start time indicator 166A to the current time indicator 166B. It is understood that as the audiovisual content 164 continues to be presented on the display 142, the current time indicator 166B progresses along the timeline 166 towards the audiovisual end time indicator 166C, which in turn causes the presented portion time period 171 to increase because the presented portion 170 of the audiovisual content 164 has increased. Similarly, as the current time indicator 166B progresses along the timeline 166 towards the audiovisual end time indicator 166C, the queued portion time period 168 will decrease along the timeline 166 because the queued portion 167 of the audiovisual content 164 (i.e., the portion of the audiovisual content 164 that is in queue to be processed and presented on the display 142 but has not yet been presented on the display 142) decreases as the current time indicator 166B gets closer to the audiovisual end time indicator 166C. As such, as the presented portion 170 of the audiovisual content 164 increases, the queued portion 167 decreases.

In some embodiments, the audiovisual screening application 114 may detect that the media application 148 has an API that is locked (e.g., the locked API 149) and in turn may use the screening agent 128 to determine an identity of the audiovisual content 164 being presented on the display 142 in order to screen the audiovisual content 164 for instances of flagged audiovisual content 157 within the portion of the audiovisual content 164 that has not yet been presented on the display 142 (i.e., the queued portion 167). In the embodiment illustrated in FIG. 2, the audiovisual screening application 114 and/or the screening agent 128 may begin scraping (e.g., by capturing instances of audio and/or a visual image from display 142) the audiovisual content 164 from the display 142 while the current time indicator 166B progresses along the timeline 166 so as to create the scraped audiovisual content 118. The audiovisual screening application 114 and/or the screening agent 128 may begin scraping the audiovisual content 164 from the display 142 at any point after the audiovisual start time indicator 166A, such as at a time period (e.g., the scraped time period 121) along the timeline 166 indicated by the scraping start time marker 120A. As such, the scraping start time marker 120A (which corresponds to the time along the timeline 166 where scraped audiovisual content 118 begins) will be positioned within the presented portion time period 171 along the timeline 166. As the scraping continues while the audiovisual content 164 is being presented on the display 142, the scraped time period 121 indicated by the scraped time period identifier 120 increases based on the amount of time that elapses during the scraping. In the embodiment shown in FIG. 2, the scraped time period identifier 120 corresponds with the difference in time between the scraping start time marker 120A and the scraping end time marker 120B, which in the example shown in FIG. 2, the scraping end time marker 120B coincides with the current time indicator 166B because the scraping may be ongoing; however, it is understood that this may not necessarily be the case in every embodiment. In some embodiments, the scraping of the audiovisual content 164 may end despite the media application 148 continuing to present the audiovisual content 164. As such, the scraped audiovisual content 118 corresponds with the audiovisual content 164 that was presented on the display 142 beginning at a time along the timeline 166 indicated by the scraping start time marker 120A and ending at a time along the timeline 166 indicated by the scraping end time marker 120B so as to yield the scraped time period 121, which is indicated by the scraped time period identifier 120. Thus, as seen in FIG. 3A, the presentation of the audiovisual content 164 may continue and the current time indicator 166B can progress along the timeline 166 towards the audiovisual end time indicator 166C while the audiovisual screening application 114 performs one or more operations discussed herein, such as but not limited to identification of the audiovisual content identifier 165 based on the scraped audiovisual content 118 and determination as to whether the flagged audiovisual content 157 that may need filtering corresponds with the queued portion 167 and thus may be in queue to be presented on the display 142. The audiovisual screening application 114 can use the scraped audiovisual content 118 and the scraped time period identifier 120 to determine the audiovisual content identifier 165 so as to identify the audiovisual content 164 without accessing the locked API 149, and in turn determine whether an instance of the audiovisual content filter 122 should be generated to filter an instance of the flagged audiovisual content 157 associated with the queued portion 167 of the audiovisual content 164.

In the example shown in FIG. 2, an instance of the flagged time indicator 156 is shown within the queued portion time period 168 along the timeline 166 so as to visually indicate that the flagged audiovisual content 157 is in queue to be presented on the display 142. It is understood that the flagged time indicator 156 is provided for clarification purposes only, and therefore in some embodiments the flagged time indicator 156 may not necessarily appear or otherwise be presented along the timeline 166. As shown in FIG. 2, the flagged time indicator 156 is provided to demonstrate that the audiovisual content flag 155 corresponds with the queued portion 167 of the audiovisual content 164, and therefore the media application 148 could present the flagged audiovisual content 157 if an instance of the audiovisual content filter 122 is not applied, such as shown in FIG. 3A which is discussed below.

Turning now to FIG. 3A with continued reference to FIGS. 1 and 2, a user interface diagram showing another example of a screen display 300 is provided according to an embodiment. The screen display 300 illustrates an example of presenting an instance of the flagged audiovisual content 157 from the media application 148 that has the locked API 149, where the flagged audiovisual content 157 is being presented without an instance of the audiovisual content filter 122 being applied, according to an embodiment. In the example shown in FIG. 3A, the screen display shows potentially objectionable content in the form of flagged audiovisual content 157 within the audiovisual content 164 being presented on the display 142. The example shown in FIG. 3A represents an embodiment in which an instance of the audiovisual content filter 122 is not presented on the display 142. As shown in FIG. 3A, the timeline 166 may continue to show the audiovisual start time indicator 166A and the audiovisual end time indicator 166C in the same positions as FIG. 2, however the current time indicator 166B may have progressed towards the audiovisual end time indicator 166C relative to the position of the current time indicator 166B shown in FIG. 2. As shown in FIG. 3A, the audiovisual screening application 114 obtained scraped audiovisual content 118 corresponding to the scraped time period identifier 120 indicating a time along the timeline 166 that spans from the scraping start time marker 120A to the scraping end time marker 120B. The current time indicator 166B is at a point along the timeline 166 so as to coincide with the flagged audiovisual content 157 that is being presented on the display 142 of the UE 140. In some embodiments, the screening agent 128 may continue to monitor the audiovisual content being presented on the display 142, but not actively scraping during the current time indicator 166B that coincides with the flagged audiovisual content 157 because the scraping already occurred during the scraped time period 121 along the timeline 166 indicated by the scraped time period identifier 120. It should be understood that the examples provided are for illustration purposes only, and therefore should not be construed as limiting in any way.

Turning now to FIG. 3B with continued reference to FIGS. 1, 2, and 3A, a user interface diagram showing yet another example screen display 350 is provided according to an embodiment. The screen display 350 illustrates an example of presenting an instance of the audiovisual content filter 126 for filtering the flagged audiovisual content 157 without accessing the locked API 149 of the media application 148, according to an illustrative embodiment. As shown in FIG. 3B, the media application 148 may provide the flagged audiovisual content 157 to the display 142, however, the flagged audiovisual content 157 may be filtered or otherwise not presented to the viewing user 130 because an instance of the audiovisual content filter 122 is provided and presented on the display 142 so as to filter the flagged audiovisual content 157 of the audiovisual content 164. In the embodiment shown in FIG. 3B, only the portions of the audiovisual content 164 corresponding to the flagged audiovisual content 157 may be filtered or otherwise not presented due to the presentation of the audiovisual content filter 122. In some embodiments, the audiovisual content filter 122 may be configured such that the flagged audiovisual content 157 is filtered while at least some of the audiovisual content 164 continues to be presented on the display 142. For example, in an embodiment, when the current time indicator 166B coincides with the flagged time indicator 156 along the timeline 166, one or more instance of the audiovisual content filter 122 may be implemented and presented on the display 142. In some embodiments, the media application 148 may provide the flagged audiovisual content 157 to the display, however, the flagged audiovisual content 157 may not be presented on the display 142 because the screening agent 128 filters the flagged audiovisual content 157 via the audiovisual content filter 122. In the embodiment shown in FIG. 3A, the screening agent 128 may be instructed by the audiovisual content filter 122 can include one or more instance of a visual overlay block (e.g., the image overlay block 126F), one or more instance of the visual distortion block 126G, and provide an audio clip replacement based on the audio clip replacement instruction 126A so as to visually filter and audibly filter the flagged audiovisual content 157 on the display 142. It should be understood that the examples provided are for illustration purposes only, and therefore should not be construed as limiting in any way.

It is understood that the embodiments shown in FIGS. 3A and 3B are for illustration purposes only, and therefore presentation of the audiovisual content 164 may occur in different formats. For example, in some embodiments, an instance of the flagged audiovisual content 157 discussed in FIG. 3B may not necessarily be presented on the entire user interface of the display 142, but instead may be embedded in a social media content feed provided by the media application 148. In this embodiment, one or more instance of the audiovisual content filter 122 may be invoked to filter one or more instance of the flagged audiovisual content 157 that is located within the social media feed. As such, in some embodiments, the timeline 166 may be embodied as a scroll bar and/or position tracker corresponding to the social media feed such and may be oriented vertically instead of horizontally as shown in FIGS. 2, 3A, and 3B. It is understood that the operations performed here may be substantially similar to the embodiments shown and discussed with respect to FIGS. 2, 3A, and 3B, as understood by one or ordinary skill. Therefore, it should be understood that the examples provided are for illustration purposes only, and therefore should not be construed as limiting in any way.

Figure 4A:
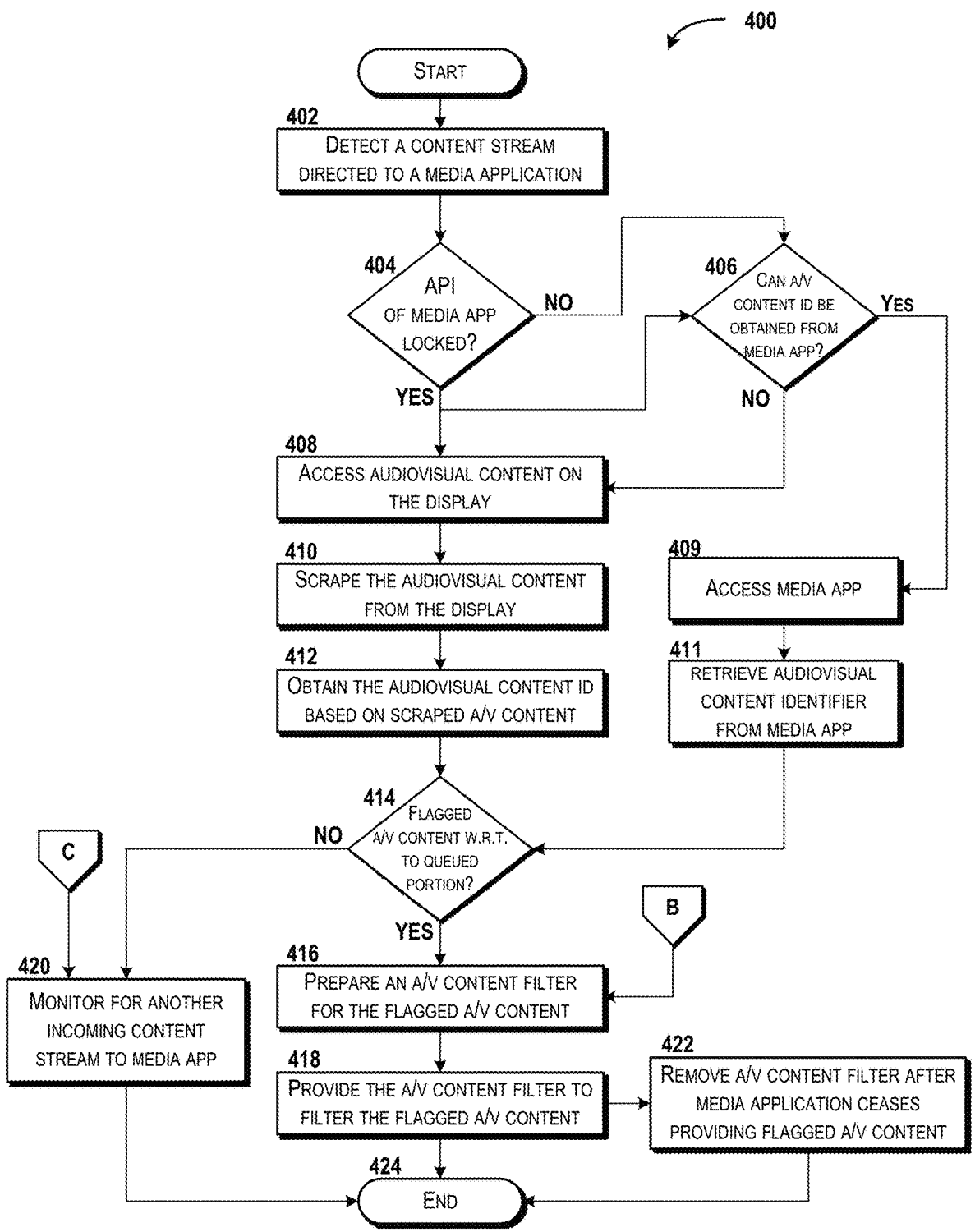
FIG. 4A is a flow diagram illustrating aspects of a method for screening and filtering audiovisual content presented by a media application having a locked application programming interface, according to an illustrative embodiment.
Figure 4B:
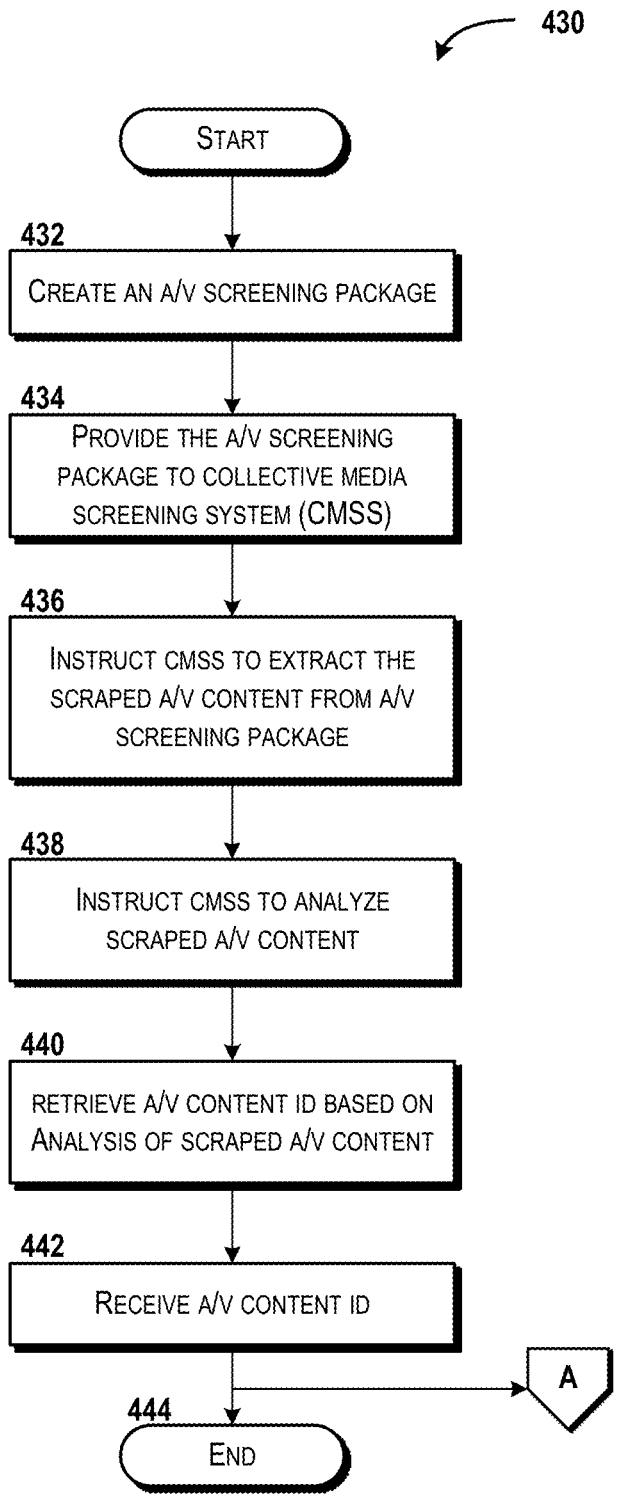
FIG. 4B is a flow diagram illustrating aspects of a method for obtaining an audiovisual content identifier to determine an identity of audiovisual content without accessing a locked application programming interface of a media application, according to an illustrative embodiment.
Figure 4C:
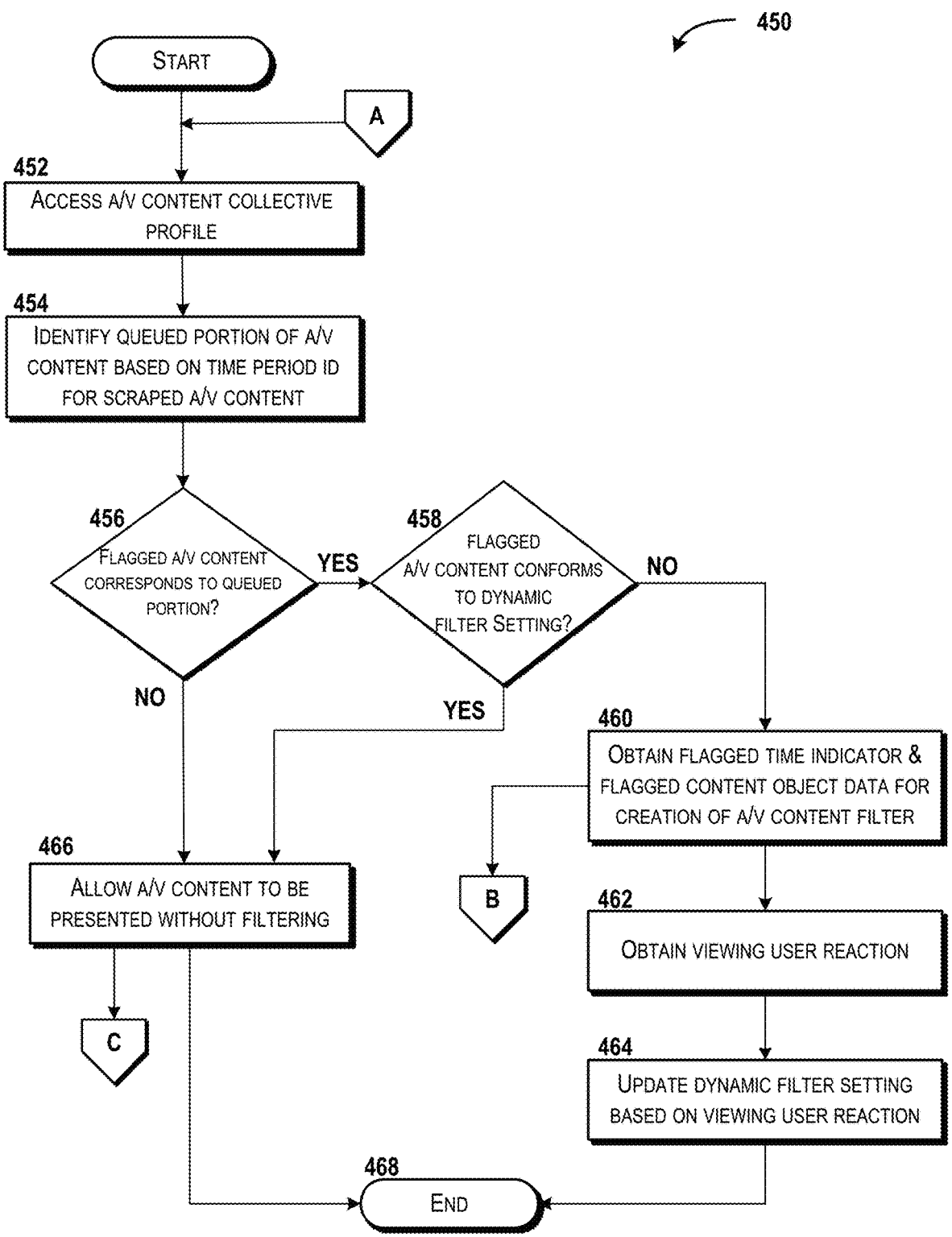
FIG. 4C is a flow diagram illustrating aspects of a method for screening and determining flagged audiovisual content presented by a media application having a locked application programming interface, according to an illustrative embodiment.

Turning now to FIGS. 4A, 4B, and 4C with continued reference to FIGS. 1, 2, 3A, and 3B, aspects of a method 400, a method 430, and a method 450 for embodiments pertaining to aspects of screening audiovisual content presented from a media application having a locked API will be described in detail, according to various illustrative embodiments. It should be understood that each of the operations of the one or more methods disclosed herein (e.g., the method 400, the method 430, and the method 450 discussed below) are not necessarily presented in any particular order and that performance of some or all of the operations in an alternative order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The term "computer-readable instructions," and variants thereof, as used herein, is used expansively to include routines, applications, modules, scripts, programs, plug-ins, data structures, algorithms, and the like. It is understood that use of the term "module" refers to a defined, callable set of computer-readable instructions that configure a processor to perform at least a portion of one or more operations and functions discussed herein so as to transform, upon execution, processing resources and/or memory resources into a particular, non-generic, machine. Computer-readable instructions can be implemented on various system configurations including but not limited to one or more of single-processor or multiprocessor systems, minicomputers, user equipment, mainframe computers, personal computers, network servers, hand-held computing devices, microprocessor-based, programmable consumer electronics, edge devices, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system so as to provide a particular, non-generic machine device. The implementation is a matter of choice dependent on the performance and other requirements of the computing system. Accordingly, the logical operations described herein are referred to variously as states, operations, structural devices, acts, functions, instructions, and/or modules. These states, operations, structural devices, acts, functions, instructions, and/or modules may be implemented in software, in firmware, in special purpose digital logic, and any combination thereof. As used herein, the phrase "cause a processor to perform operations" and variants thereof is used to refer to causing and transforming a processor of a computing system or device, such as any component within the network 102, the CED 104, the UE 140, the CMSS 150, and/or the MCDS 160, to perform one or more operations and/or causing one or more instances of a processor to direct other components a computing system or device, to perform one or more of the operations.

For purposes of illustrating and describing the concepts of the present disclosure, the operations of methods disclosed herein are described as being performed by one or more of the CED 104, the UE 140, the CMSS 150, and/or MCDS 160 via execution of one or more computer-readable instructions configured as data that can instruct and transform a processor, such as, for example without limitation, the media delivery service 161, the audiovisual screening application 114, the screening agent 128, the media screening service 151, the audiovisual content identification application 152 that configure one or more processor (e.g., the processor 110 and/or the processor 144). It should be understood that additional and/or alternative devices and/or network components can, in some embodiments, provide the functionality described herein via execution of one or more modules, applications, and/or other software including, but not limited to, the other instances of the media delivery service 161 on the MCDS 160 and/or the media application 148 on a UE (e.g., the UE 140) and/or other content made available via the network 102 (e.g., content stream 163 that includes the audiovisual content 164). Thus, the illustrated embodiments are illustrative, and should not be viewed as being limiting in any way. The method 400, the method 430, and the method 450 will be described with reference to one or more of the FIGS. 1, 2, 3A, 3B, and 4A-4C.

Turning now to FIG. 4A, the method 400 for screening and filtering audiovisual content presented by a media application having a locked application programming interface is disclosed, according to an embodiment. It should be understood that the examples provided are for illustration purposes only, and therefore should not be construed as limiting in any way. In some embodiments, the CED 104 can execute the audiovisual screening application 114 that causes one or more processor to perform operations discussed herein. In some embodiments, the method 400 can begin at operation 402, where the audiovisual screening application 114 can detect the content stream 163 directed to the media application 148 that has the locked API 149 and executes on the UE 140. The content stream 163 can include the audiovisual content 164 that is presented on the display 142 of the UE 140 via execution of the media application 148. In some embodiments, the content stream 163 is encrypted or otherwise configured such that the audiovisual screening application 114 and/or the screening agent 128 cannot access the audiovisual content 164 directly from the content stream 163 and cannot identify the audiovisual content 164 directly from the content stream 163. In some embodiments the audiovisual screening application 114 may detect the content stream 163 based on the screening agent 128 monitoring incoming and outgoing communications from the UE 140. In some embodiments, the audiovisual screening application 114 and/or the screening agent 128 may detect that the content stream 163 is directed to the media application 148, but may not be able to intercept, decrypt, or otherwise analyze the content stream 163 so as to identify the audiovisual content 164 directly from the content stream 163, and therefore cannot obtain the audiovisual content identifier 165 directly from the content stream 163 that is being provided to the media application 148.

From operation 402, the method 400 can proceed to operation 404, where the audiovisual screening application 114 can determine whether the application programming interface (of the media application to which the content stream is directed) is locked. For example, the audiovisual screening application 114 may determine that the application programming interface (i.e., the locked API 149) corresponding to the media application 148 is locked such that the audiovisual content 164 from the content stream 163 is not accessible via the locked API 149. In some embodiments, the audiovisual screening application 114 can determine that the locked API 149 is inaccessible by instructing the screening agent 128 to attempt access the media application 148 via the locked API 149 by requesting the audiovisual content identifier 165 from the media application 148 using the locked API 149. When the media application 148 does not respond and/or the screening agent 128 and the audiovisual screening application 114 does not receive the audiovisual content identifier 165 in response to the request, then the locked API 149 of the media application 148 is confirmed to be locked.

Therefore, if the application programming interface corresponding to the media application 148 is locked (e.g., the locked API 149 of the media application 148) and therefore is not accessible without the API access credentials 163A (which the audiovisual screening application 114 and/or the screening agent 128 does not possess), then the method 400 may proceed from operation 404 along the YES path to operation 408. In some embodiments, from operation 404, the method 400 may proceed along the YES path to operation 406, which is discussed below. In some embodiments, if the application programming interface corresponding to the media application 148 is not locked (e.g., in an embodiment where the media application 148 authorizes access to the audiovisual content 164 via an unlocked application programming interface without the use of access credentials) and therefore information (e.g., the audiovisual content identifier 165 and/or any other information from the content stream 163 and/or about the audiovisual content 164) can be accessed and obtained directly from the media application 148 via an unlocked application programming interface, then the method 400 may proceed from operation 404 along the NO path to operation 406. For clarity, a discussion of operation 406 will be provided below a discussion of other operations, such as the operation 408.

At operation 406, the audiovisual screening application 114, such as via activation of the screening agent 128) can determine whether the audiovisual content identifier 165 can be obtained from the media application 148. For example, the audiovisual screening application 114 may initiate a request to the media application 148 for the audiovisual content identifier 165 that corresponds with the audiovisual content 164 included in the content stream 163. In some embodiments, the audiovisual screening application 114 can determine that the audiovisual content identifier 165 can be obtained from media application 148 if the media application 148 provides a response that includes the audiovisual content identifier 165. If the audiovisual content identifier 165 can be obtained directly from the media application 148, then the method 400 can proceed from operation 406 along the YES path to operation 409. If the media application 148 does not provide a response and/or does not provide the audiovisual content identifier 165, then the audiovisual content identifier 165 cannot be obtained directly from the media application 148, and therefore the method 400 may proceed from operation 406 along the NO path to operation 408. In some embodiments, the audiovisual content identifier 165 cannot be obtained from the media application 148 based on the application programming interface corresponding to the media application 148 being locked (e.g., the locked API 149). For clarity, a discussion of the method 400 that proceeds along the YES path from operation 406 to operation 409 will be provided first, followed by a discussion along the NO path to operation 408.

At operation 409, the audiovisual screening application 114 (e.g., via the screening agent 128) can access the media application 148 via an unlocked application programming interface. From operation 409, the method 400 may proceed to operation 411, where the audiovisual screening application 114 can retrieve the audiovisual content identifier 165 directly from the media application 148 via the unlocked application programming interface. From operation 411, the method 400 may proceed to operation 414, which will be discussed in detail below following a discussion of operation 408.

Returning to operation 404, if the audiovisual screening application 114 determines that the application programming interface corresponding to the media application 148 is locked and/or that the audiovisual content identifier 165 cannot be obtained from the media application 148, then the method 400 may proceed to operation 408. At operation 408, the audiovisual screening application 114 can access the audiovisual content 164 that is being presented on the display 142 (e.g., because the media application 148 is providing the audiovisual content 164 to the display 142) without accessing the locked API 149 corresponding to the media application 148. The audiovisual screening application 114 may have independent access to the display 142, and as such, can access any content being presented on the display 142 irrespective of the application providing the content (e.g., the media application 148 providing the audiovisual content 164 from the content stream 163 to the display 142). In some embodiments, the audiovisual content 164 can be accessed by bypassing locked API 149 of the media application 148 such that the display 142 is accessed directly, such as through a dedicated communication channel and/or based on the screening agent 128. In some embodiments, the screening agent 128 may have root access to the display 142 of the UE 140 so as to directly access the display 142 while another application (e.g., the media application 148) is providing the audiovisual content 164 to the display 142. It should be understood that the examples provided are for illustration purposes only, and therefore should not be construed as limiting in any way.

From operation 408, the method 400 can proceed to operation 410, where the audiovisual screening application 114 can scrape (e.g., via the screening agent 128) the audiovisual content 164 from the display 142 for a defined period of time (e.g., the scraped time period 121). Scraping the audiovisual content 164 while the media application 148 provides and presents the audiovisual content 164 on the display 142 can create an instance of the scraped audiovisual content 118, where the scraped audiovisual content 118 corresponds to the presented portion 170 of the audiovisual content 164 that was presented on the display 142 during the scraped time period 121, such as shown and discussed with respect to FIGS. 2, 3A, and 3B. In some embodiments, the audiovisual screening application 114 can create a time period identifier indicating the time period during which the scraping occurred, such as the scraped time period identifier 120 indicating the scraped time period 121 that corresponds with the scraped audiovisual content 118.

From operation 410, the method 400 can proceed to operation 412, where the audiovisual screening application 114 can obtain the audiovisual content identifier 165 corresponding to the audiovisual content 164 based on the scraped audiovisual content 118, where the audiovisual content identifier 165 can be obtained while the application programming interface of the media application 148 remains locked or otherwise is not accessed. In some embodiments, the audiovisual content identifier 165 can be obtained based on providing the scraped audiovisual content 118 to the audiovisual content identification application 152 that provides visual image and/or audio recognition, which in turn can be used to identify the audiovisual content 164. In some embodiments, obtaining the audiovisual content identifier 165 can include one or more operations discussed with respect to the method 430, which is shown in FIG. 4B and discussed below.

From operation 412, the method 400 can proceed to operation 414, where the audiovisual screening application 114 can determine whether the audiovisual content 164 of the content stream 163 includes one or more instance of flagged audiovisual content with respect to the queued portion 167 of the audiovisual content 164 that has not yet been presented on the display 142. For example, as shown in FIG. 2, the queued portion time period 168 (corresponding to the queued portion 167 of the audiovisual content 164 that has not yet been presented on the display 142 but is in queue to be presented) can include an instance of the flagged time indicator 156. Using the audiovisual content identifier 165, the audiovisual screening application 114 can access the audiovisual content profile 154 associated with the audiovisual content 164 and determine whether an audiovisual content flag 155 exists, and if so, whether an instance of the flagged time indicator 156 occurs within the queued portion time period 168 so as to indicate that an instance of the flagged audiovisual content 157 corresponds with the queued portion 167 of the audiovisual content 164 that has not yet been presented on the display 142. As such, the audiovisual screening application 114 can determine that the content stream 163 includes an instance of the flagged audiovisual content 157 based on an instance of the audiovisual content flag 155 having the flagged time indicator 156 that corresponds with the queued portion 167 of the audiovisual content 164 that has not yet been presented on the display 142.

In some embodiments, if an instance of flagged audiovisual content 157 does not correspond with the queued portion 167 of the audiovisual content 164 (which has not yet been presented on the display 142), then the method 400 may proceed along the NO path to operation 420. At operation 420, the audiovisual screening application 114 may continue to monitor the UE 140 for another instance of a content stream that is incoming to the UE 140 and directed to the media application 148 having the locked API 149. In some embodiments, the audiovisual screening application 114 may monitor another instance of an incoming content stream that is directed to another application on the UE 140, and in turn may perform one or more operations discussed herein. In some embodiments, the method 400 may proceed from operation 420 to operation 424, where the method 400 can end.

Returning to operation 414, if the audiovisual screening application 114 determines that an instance of flagged audiovisual content 157 corresponds with the queued portion 167 of the audiovisual content 164 that has not been presented on the display 142, then the method 400 may proceed along the YES path to operation 416.

At operation 416, the audiovisual screening application 114 can prepare an instance of the audiovisual content filter 122 for filtering the flagged audiovisual content 157 that is included in the queued portion 167 that has not yet been presented on the display 142. The audiovisual content filter 122 can include audiovisual content filter data 124 that can be based on the flagged content object data 159 corresponding to the flagged audiovisual content 157. In some embodiments, the audiovisual content filter 122 can include one or more of the audio clip replacement instruction 126A, the audio clip cancellation instruction 126B, the content redirect instruction 126C, the processor buffer instruction 126D, the time jump instruction 126E, an instruction to provide one or more instance of the image overlay block 126F, an instruction to provide one or more instance of the visual distortion block 126G, or an instruction to provide one or more instance of the content summary block 126H. In some embodiments, an instance of the audiovisual content filter 122 can be generated prior to the queued portion 167 of the audiovisual content 164 being presented on the display 142. In some embodiments, when the processor buffer instruction 126D is included in the audiovisual content filter 122, the screening agent 128 can be instructed to identify the media application process thread 144A executing on the processor 144, where the media application process thread 144A is associated with the media application 148 that provides and presented the audiovisual content 164. The screening agent 128 may also be instructed to inject a buffer command into the media application process thread 144A such that the audiovisual content filter 122 stalls or otherwise causes the processor 144 to buffer and not present the flagged audiovisual content 157, thereby filtering the flagged audiovisual content 157 without accessing the locked API 149. It should be understood that the examples provided are for illustration purposes only, and therefore should not be construed as limiting in any way.

From operation 416, the method 400 can proceed to operation 418, where the audiovisual screening application 114 can provide the audiovisual content filter 122 to the display 142 such that the audiovisual content filter 122 filters the flagged audiovisual content 157 provided by the media application 148 without accessing the locked API 149. In some embodiments, the audiovisual content filter 122 can be relayed by the screening agent 128 to the display 142 so as to filter the flagged audiovisual content 157. In some embodiments, the method 400 may proceed from operation 418 to operation 424, where the method 400 may end. In some embodiments, the method 400 can proceed from operation 418 to operation 422, where the audiovisual content filter 122 is removed from the display 142 after the media application 148 ceases providing the flagged audiovisual content 157 to the display 142. From operation 422, the method 400 can proceed to operation 424, where the method 400 can end.

Turning now to FIG. 4B, the method 430 for determining an identity of audiovisual content presented by a media application having a locked application programming interface without accessing the locked application programming interface is disclosed, according to an illustrative embodiment. It should be understood that the examples provided are for illustration purposes only, and therefore should not be construed as limiting in any way. In some embodiments, determining the identity of audiovisual content presented by the media application without accessing the locked application programming interface can be accomplished by obtaining an audiovisual content identifier corresponding to the audiovisual content presented by the media application, such as the audiovisual content identifier 165 corresponding to the audiovisual content 164 presented by the media application 148. In some embodiments, one or more operations of the method 430 can be implemented to obtain the audiovisual content identifier 165. It should be understood that the examples provided are for illustration purposes only, and therefore should not be construed as limiting in any way.

In some embodiments, the method 430 can begin at operation 432, where the audiovisual screening application 114 can create an instance of the audiovisual screening package 116. The audiovisual screening package 116 can include the scraped audiovisual content 118, the scraped time period identifier 120 corresponding to the scraped time period 121 over which the scraped audiovisual content 118 was created, the scraping start time marker 120A, and/or the scraping end time marker 120B. In some embodiments, the audiovisual screening package 116 may include an identifier corresponding to the media application 148 that is presenting the audiovisual content 164 on the display 142.

From operation 432, the method 430 can proceed to operation 434, where the audiovisual screening application 114 can provide the audiovisual screening package 116 to the CMSS 150 or other system that provides the media screening service 151. From operation 434, the method 430 can proceed to operation 436, where the audiovisual screening application 114 can instruct the CMSS 150 and/or the media screening service 151 to extract the scraped audiovisual content 118 and the scraped time period identifier 120 from the audiovisual screening package 116. From operation 436, the method 430 can proceed to operation 434, where the audiovisual screening application 114 can instruct the CMSS 150 and/or the media screening service 151 to analyze the scraped audiovisual content so as to identify the audiovisual content 164 so that the audiovisual content identifier 165 can be obtained and provided to the audiovisual screening application 114. For example, in some embodiments, the scraped audiovisual content 118 can be provided to the audiovisual content identification application 152 that provides and performs image recognition and/or audio recognition by matching the scraped audiovisual content 118 with instance of media content from the media content data source 162 because the audiovisual content 164 is based on an instance of media content provided by the media content data source 162. From operation 438, the method 430 can proceed to operation 434, where the media screening service 151 can retrieve the audiovisual content identifier 165 from the media content data source 162 based on analysis of the scraped audiovisual content 118 that yielding a match with an instance of the audiovisual content 164 stored in the media content data source 162. The media screening service 151 can provide the audiovisual content identifier 165 to the audiovisual screening application 114 in response to the audiovisual screening package 116 being sent to the CMSS 150. From operation 440, the method 430 can proceed to operation 442, where the audiovisual screening application 114 can receive the audiovisual content identifier 165, and thereby obtain the audiovisual content identifier 165 without accessing the media application 148 via the locked API 149. From operation 442, the method 430 can proceed to operation 444, where the method 430 can end. In some embodiments, the method 430 may proceed from operation 442 to operation 451, which is discussed below with respect to the method 450 shown in FIG. 4C.

Turning now to FIG. 4C, the method 450 for screening and determining flagged audiovisual content that may be in queue to be presented by a media application having a locked application programming interface, according to an illustrative embodiment. In some embodiments, the method 450 can begin at operation 452, where the audiovisual screening application 114 can access the audiovisual content profile 154 based on obtaining the audiovisual content identifier 165, where the audiovisual content profile 154 corresponds with the audiovisual content 164 associated with the audiovisual content identifier 165.

From operation 452, the method 450 can proceed to operation 454, where the audiovisual screening application 114 can identify the queued portion 167 of the audiovisual content 164 corresponding to the queued portion time period 168 based on the scraped time period identifier 120 associated with the scraped audiovisual content 118.

From operation 454, the method 450 can proceed to operation 456, where the audiovisual screening application 114 can determine whether one or more instances of flagged audiovisual content (e.g., the flagged audiovisual content 157) corresponds to the queued portion 167 of the audiovisual content 164. For example, the audiovisual screening application 114 can determine whether an instance of the audiovisual content flag 155 exists within the audiovisual content profile 154 so as to indicate the presence of flagged audiovisual content 157 within the audiovisual content 164. If an instance of the audiovisual content flag 155 is present, the audiovisual screening application 114 can determine whether the flagged time indicator 156 provided by the audiovisual content flag 155 corresponds with (i.e., falls within) the queued portion time period 168 on the timeline 166. If the flagged time indicator 156 corresponds with the queued portion time period, then the flagged audiovisual content 157 corresponds queued portion 167 of the audiovisual content 164 that is in queue to be processed and provided to the display 142 but has not yet been presented on the display 142. As such, in response to determination that the flagged audiovisual content 157 corresponds with the queued portion 167, then the method 450 may proceed along the YES path to operation 458. If the flagged time indicator 156 does not correspond with or otherwise fall within the queued portion time period 168 on the timeline 166, then one or more instances of flagged audiovisual content does not exist within the remaining portion of the audiovisual content 164 that is to be presented on the display 142 (i.e., the queued portion 167). As such, in response to determining that flagged audiovisual content does not exist or otherwise correspond with the queued portion 167, then the method 450 can proceed along the NO path to operation 466. For clarity, a discussion of operation 458 will be provided first, followed by a discussion of operation 466.

At operation 458, the audiovisual screening application 114 may determine whether the flagged audiovisual content 157 corresponding to the queued portion 167 of the audiovisual content 164 conforms to an instance of the dynamic filter setting 131 associated with filtering content for the UE 140, the media application 148, and/or the viewing user 130. In some embodiments, the audiovisual screening application 114 can analyze the flagged content object data 159 to determine the type of content that could be considered objectionable material (e.g., visual image, audio clip, word string, a combination thereof, or the like) and/or the flagged audiovisual setting value 158 corresponding to the flagged audiovisual content 157. In some embodiments, each instance of the flagged audiovisual content 157 may be assigned a rating and/or value (e.g., the flagged audiovisual setting value 158) by which to compare with the dynamic filter setting 131 (e.g., implemented as a defined filter value indicating a threshold as to when content should be filtered) so as to determine whether the flagged audiovisual content 157 should be filtered for the particular viewing user 130, the media application 148, the UE 140, or other entity associated with the dynamic filter setting 131. By this, the media screening service 151 can provide a tailored and/or customized filtering experience for a variety of media applications, irrespective of whether the media applications have an application programming interface that is locked and therefore inaccessible without the access credentials to the corresponding application programming interface (e.g., the locked API 149).

In an embodiment where the flagged audiovisual setting value 158 does not meet or exceed a value of the dynamic filter setting 131, then the flagged audiovisual content 157 conforms to the dynamic filter setting 131 so as to indicate that the flagged audiovisual content 157 may not be considered to be objectionable to the viewing user 130 and thus can be presented on the display 142. Therefore, when the flagged audiovisual content 157 conforms to the dynamic filter setting 131, then the method 450 may proceed along the YES path to operation 466.

At operation 466, the audiovisual content 164 can be allowed to be presented by the media application 148 on the display 142 without filtering the audiovisual content 164 or otherwise interrupting the playback of the queued portion 167 of the audiovisual content 164. In some embodiments, from operation 466, the method 450 may proceed to operation 420 discussed with respect to FIG. 4A. In some embodiments, the method 450 may proceed from operation 466 to operation 468, where the method 450 can end.

Returning to operation 458, in an embodiment, if the flagged audiovisual setting value 158 meets and/or exceeds the dynamic filter setting 131 for the flagged audiovisual content 157, then the flagged audiovisual content 157 does not conform to the dynamic filter setting 131 and the audiovisual screening application 114 determines that the flagged audiovisual content 157 should be filtered via creation of an instance of the audiovisual content filter 122. As such, when the flagged audiovisual content 157 does not confirm to the dynamic filter setting 131 (e.g., by the flagged audiovisual setting value 158 exceeding a value indicated by the dynamic filter setting 131), then the method 450 may proceed along the NO path to operation 460.

At operation 460, the audiovisual screening application 114 may obtain the flagged time indicator 156 and/or the flagged content object data 159 for use in creating an instance of the audiovisual content filter 122 that is configured to specifically filter the flagged audiovisual content 157 at the time along the timeline 166 indicated by the flagged time indicator 156. In some embodiments, the method 450 may proceed from operation 460 to operation 416 discussed with respect to FIG. 4A. In some embodiments, the method 450 may proceed from operation 460 to operation 462. In some embodiments, the operation 462 may occur after the audiovisual content filter 122 has been provided to the display 142 so as to filter the flagged audiovisual content 157 for the viewing user 130.

At operation 462, the audiovisual screening application 114 may obtain a reaction from the viewing user 130 corresponding to the audiovisual content filter 122. For example, the screening agent 128 may detect a reaction (e.g., a grimace, facial expression, or other reaction) from the viewing user 130 while the flagged audiovisual content 157 is being filtered by the audiovisual content filter 122. The screening agent 128 may record the reaction of the viewing user 130 as an instance of the viewing user response 134. In some embodiments, the viewing user 130 may provide direct input to the screening agent 128 so that the viewing user response 134 is based on input from the viewing user 130. The viewing user response 134 can be provided to the audiovisual screening application 114.

From operation 462, the method 450 may proceed to operation 464, where the audiovisual screening application 114 may analyze the viewing user response 134 and update one or more instance of the dynamic filter setting 131 based on the viewing user response 134 that captures the reaction and/or input of the viewing user 130. By this, the media screening service 151 can adapt and refine filtering of instance of flagged audiovisual content for other content streams directed to the same or different media application. In some embodiments, the media screening service 151 can employ machine learning to dynamically adapt and update one or more dynamic filter setting 131 for one or more users of the media screening service 151, thereby allowing for autonomous content filtering irrespective of an application programming interface being locked. From operation 464, the method 450 may proceed to operation 468, where the method 450 can end.

Figure 5:
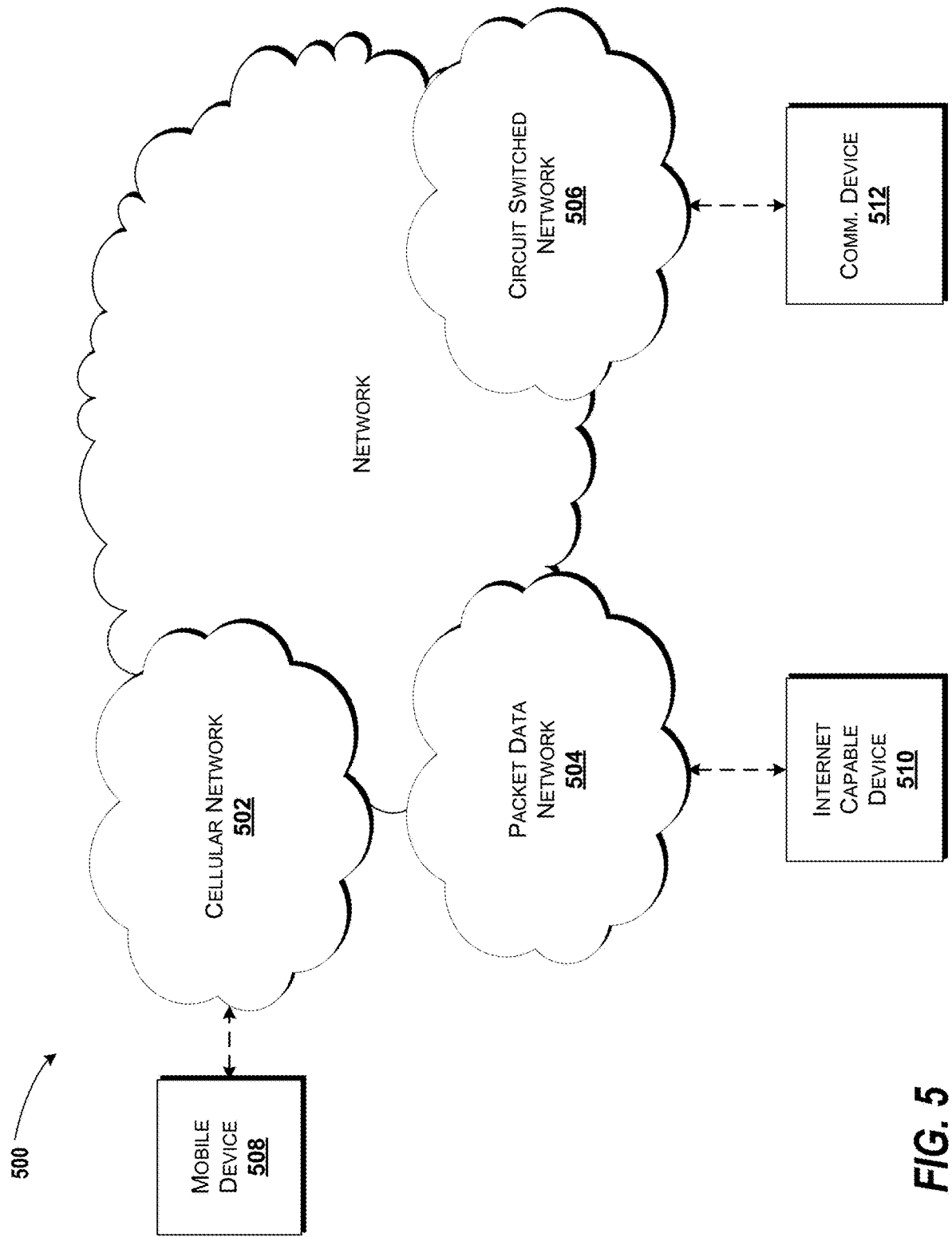
FIG. 5 is a diagram illustrating an example network capable of implementing aspects of the embodiments discussed herein.

Turning now to FIG. 5, a discussion of a network 500 is illustrated, according to an illustrative embodiment. The network 102 shown in FIG. 1 can be configured substantially similar to include at least some of the elements of the network 500. The network 500 can include a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also can be compatible with mobile communications standards such as but not limited to 4G, LTE, LTE Advanced, and/or 5G, as well as evolved and future mobile standards.

The packet data network 504 includes various devices, for example, servers, computers, databases, and other devices in communication with one another, as is generally understood. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" and/or "pointers" in the retrieved files, as is generally understood. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In some embodiments, the mobile communications device 508, the Internet-capable device 510, and/or the communications device 512 can correspond with one or more computer systems discussed with respect to FIG. 1, such as but not limited to the MCDS 160, the CED 104, the UE 140, and/or the CMSS 150. In the specification, the network 102 and/or the network 500 can refer broadly to any combination of the networks 502, 504, 506. It should be appreciated that substantially all of the functionality described with reference to the network 102 and/or the network 500 can, in some embodiments, be performed by the cellular network 502, the packet data network 504, and/or the circuit switched network 506, alone or in combination with other networks, network elements, and the like.

Figure 6:
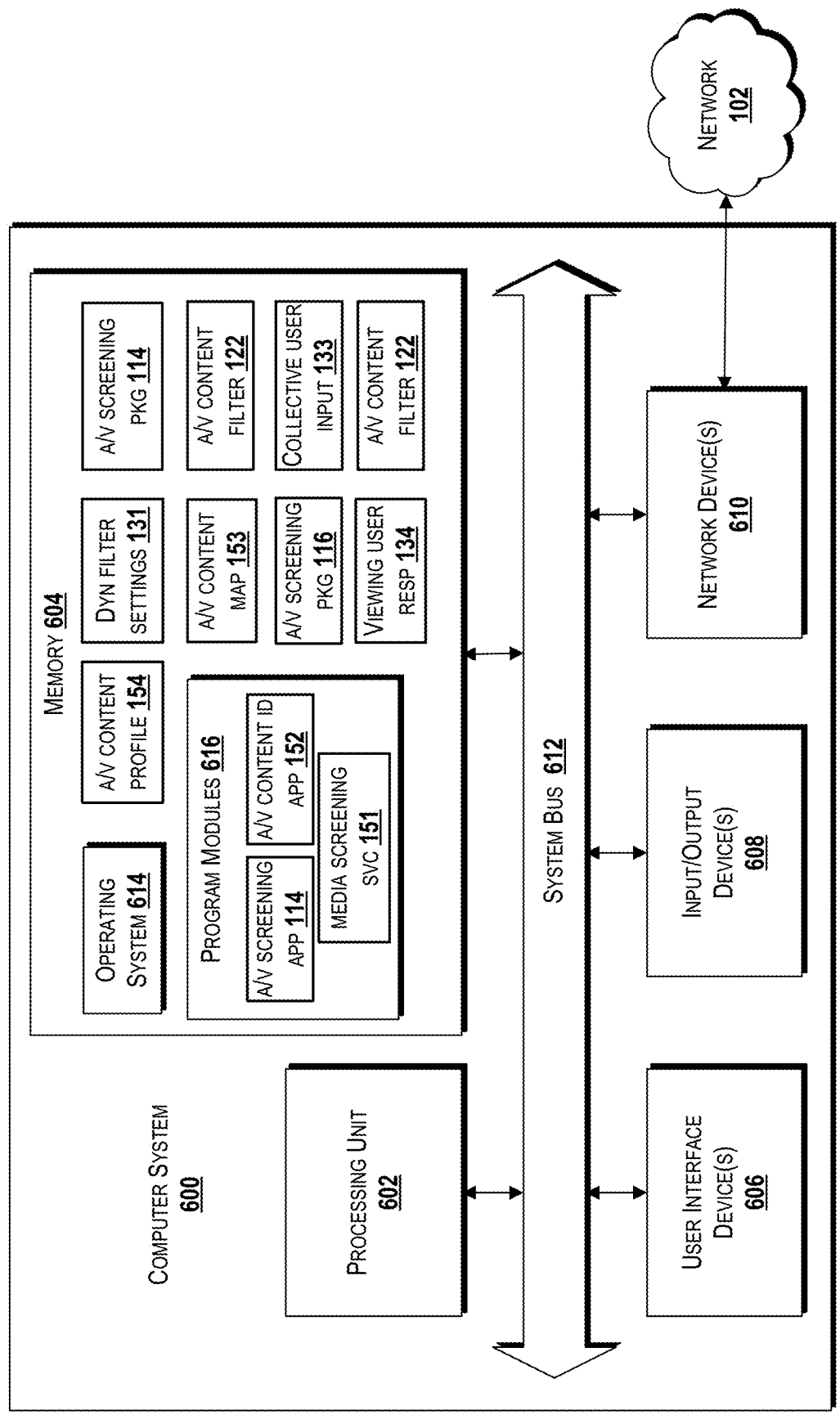
FIG. 6 is a block diagram illustrating an example computer system capable of implementing aspects of the embodiments presented and described herein.

FIG. 6 is a block diagram illustrating a computer system 600 configured to provide the functionality described herein for providing screening and filtering of audiovisual content presented by a media application having a locked application programming interface, in accordance with various embodiments of the concepts and technologies disclosed herein. In aspects, the MCDS 160, the CMSS 150, and/or the CED 104 illustrated and described herein can be configured as and/or can have an architecture similar or identical to the computer system 600. In some embodiments, the UE 140 can be configured as and/or have an architecture that is similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610. In some embodiments, the processor 110 can be configured substantially similar to the processing unit 602. As such, one or more instances of the processing unit 602 can be implemented within one or more devices and/or components of the operating environment 100, such as but not limited to the CMSS 150, the MCDS 160, the CED 104, and/or the UE 140. In some embodiments, the memory 146 can be configured substantially similar to the memory 604. As such, one or more instances of the memory 604 can be implemented within one or more devices and/or components of the operating environment 100, such as but not limited to the CMSS 150, the MCDS 160, the CED 104, the media content data source 162, and/or the UE 140.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known to one of ordinary skill, the processors and processing units disclosed and discussed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software, program modules, or other computer readable and/or executable instructions that configure hardware resources of the computer system 600, such as but not limited to the processing unit 602 described herein. In some embodiments, for example, the program modules 616 can include media screening service 151, the audiovisual screening application 114, the audiovisual content identification application 152, the screening agent 128, the media delivery service 161, and/or other computer-readable instructions. These and/or other programs can be embodied in computer-readable media containing instructions that, when executed by the processing unit 602, perform one or more of the methods 400, 400, 430, and 450 described in detail above with respect to FIGS. 4A-4C. According to some embodiments, the program modules 616 may be embodied in hardware, software, firmware, or any combination thereof. It should be understood that the memory 604 also can be configured to store one or more instance of information and data discussed with respect to FIGS. 1, 2, 3A, 3B, and 4A-4C, such as but not limited to the audiovisual content profile 154, the dynamic filter settings 131, the audiovisual content map 153, the audiovisual content flag 155, the flagged time indicator 156, the flagged audiovisual content 157, the flagged audiovisual setting value 158, the flagged content object data 159, the audiovisual screening package 116, the audiovisual content filter 122, the scraped audiovisual content 118, the scraped time period identifier 120, the scraping start time marker 120A, the scraping end time marker 120B, the content stream 163, the audiovisual content 164, the audiovisual content identifier 165, the API access credentials 163A, the viewing user response 134, the collective user input 133, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrases "memory," "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices that can communicate with the computer system 600. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 102. Examples of the network devices 610 include, but are not limited to, a modem, a radio frequency ("RF") or infrared ("IR") transceiver, a telephonic interface, a bridge, a router, or a network card. The network 102 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 102 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN"). It should be understood that the examples provided are for illustration purposes only, and therefore should not be construed as limiting in any way.

Figure 7:
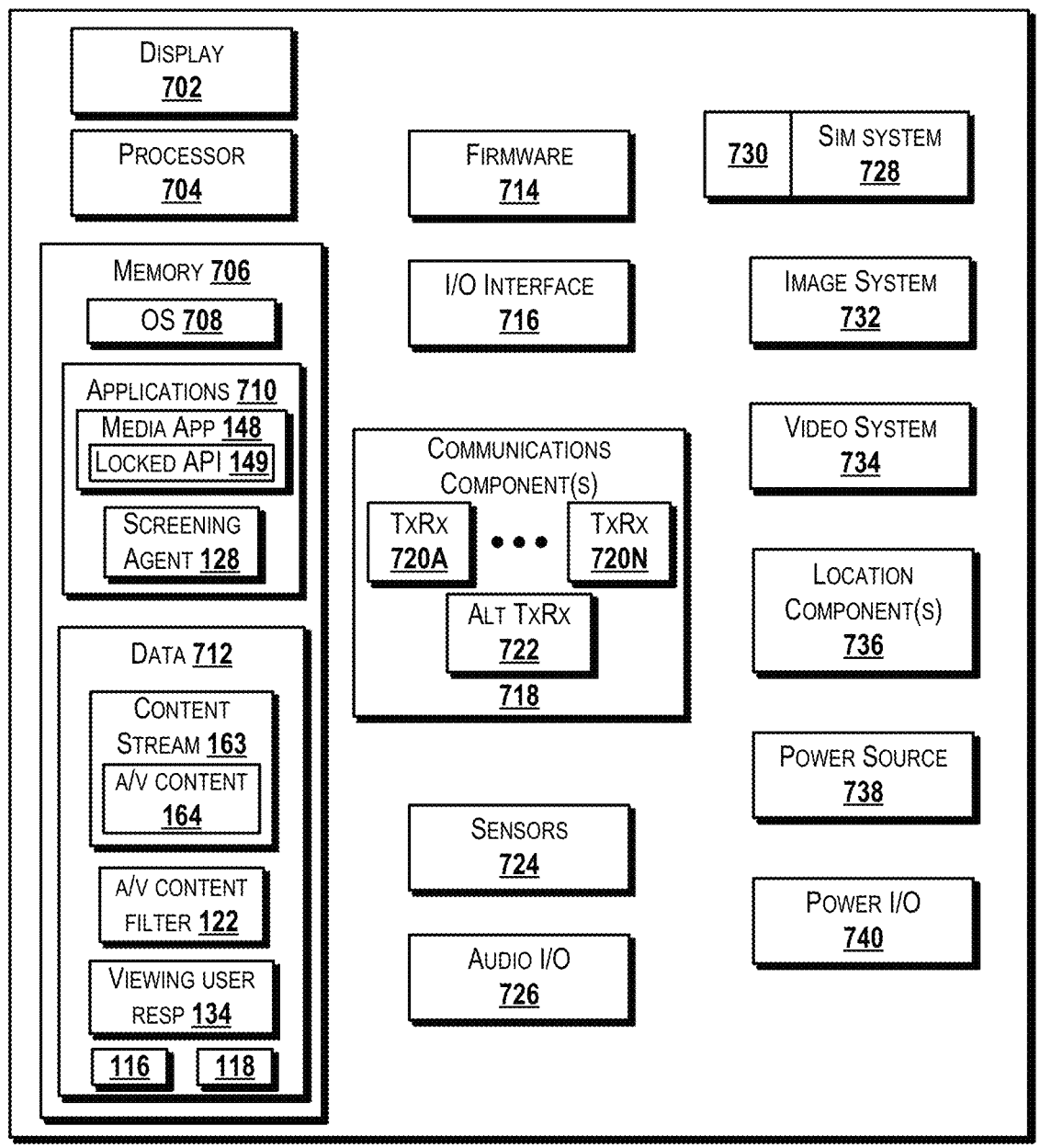
FIG. 7 is a diagram illustrating an example user equipment capable of implementing aspects of the concepts and technologies described herein according embodiments of the present disclosure.

Turning now to FIG. 7, an illustrative user equipment 700 and components thereof will be described. In some embodiments, the UE 140, the CED 104 and/or other devices illustrated and described herein can be configured as and/or can have an architecture similar or identical to the user equipment 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the user equipment 700 can include a display 702 for presenting data and information. According to various embodiments, the display 702 can be configured to present various graphical user interface ("GUI") elements for presenting and/or modifying information associated with audiovisual content, an audiovisual content filter, presenting text, images, video, virtual keypads and/or keyboards, messaging data, notification messages, metadata, internet content, device status, time, date, calendar data, device preferences, map and location data, combinations thereof, and/or the like. The user equipment 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the media application 148 having the locked API 149, the screening agent 128, the audiovisual screening application 114, the media screening service 151, the audiovisual content identification application 152, and/or other computer-executable instructions stored in a memory 706, or the like. In some embodiments, the applications 710 also can include a UI application (not illustrated in FIG. 7).

The UI application can interface with the operating system 708 to facilitate any of the operations discussed herein and functionality for presenting audiovisual content and/or data stored at the user equipment 700 and/or stored elsewhere. It is understood that one or more instances of the operating system 708 may be included and operate within one or more systems discussed with respect to the operating environment 100, such as but not limited to the CED 104, the UE 140, the CMSS 150, and/or the MCDS 160. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in presenting content, presenting an audiovisual content filter (e.g., the audiovisual content filter 122), providing feedback (e.g., the collective user input 133 and/or the viewing user response 134), selecting audiovisual content to view (e.g., from the media delivery service 161), configuring settings, manipulating address book content and/or settings, multimode interaction, interacting with other applications 710, and otherwise facilitating user interaction with the operating system 708, the applications 710, and/or other types or instances of data 712 that can be stored at the user equipment 700, such as stored by the memory 706. The UI application can execute and provide one or more instances of screen displays discussed herein, such as embodiments of the screen displays 200, 300, and 350 shown in FIGS. 2, 3A, and 3B, respectively. According to various embodiments, the data 712 can include, for example, instances of a content stream (e.g., the content stream 163), the audiovisual content 164, the audiovisual content filter 122, the viewing user response 134, the scraped audiovisual content 118, the audiovisual screening package 116, any other elements discussed with respect to FIG. 1 and FIGS. 2A-2D, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The user equipment 700 also can include an input/output ("I/O") interface 716. One or more instances of the I/O interface 716 can be included any system and/or device discussed in FIG. 1 (e.g., the CED 104 and/or the UE 140), such as via the audiovisual interface 106 and/or the network interface 108. As such, in some embodiments, each of the CED 104 and the UE 140 can include one or more embodiments of the I/O interface 716, such as each of the CED 104 and the UE 140 having one or more instances of the audiovisual interface 106 and/or the network interface 108. The I/O interface 716 can be configured to support the input/output of data such as the content stream 163, the audiovisual content 164, the audiovisual content filter 122, the viewing user response 134, the scraped audiovisual content 118, the audiovisual screening package 116 (and/or any data that can be included therein such as but not limited to the scraped audiovisual content 118), and/or any other information or elements discussed with respect to FIGS. 1, 2, 3A and 3B, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the user equipment 700 can be configured to synchronize with another device to transfer content to and/or from the user equipment 700. In some embodiments, the user equipment 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the user equipment 700 and a network device or local device. For example, an instance of the I/O interface 716 can provide communicative coupling between the UE 140 and the CED 104 (e.g., via one or more instances of the audiovisual interface 106 and/or the network interface 108 that can be implemented on each of the CED 104 and the UE 140).

The user equipment 700 also can include a communications component 718. The communications component 718 can be configured to interface with the processor 704 to facilitate wired and/or wireless communications with one or more networks such as the network 102 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks. The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5, G, LTE, LTE Advanced, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The user equipment 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the user equipment 700 may be provided by an audio I/O component 726. The audio I/O component 726 of the user equipment 700 can include one or more speakers for the output of audio signals, one or more microphones for the collection and/or input of audio signals, and/or other audio input and/or output devices. In some embodiments, the audio I/O component 726 maybe included as a component of the display 702. For example, in some embodiments, the display 702 can provide and present visual images and/or audio input and/or audio output. In some embodiments, the I/O interface 716 can include direct communicative coupling with the display 702 and/or the audio I/O component 726 so as to provide transfer and input and/or output of visual images (e.g., from the display 702) and/or audio clips (e.g., from the audio I/O component 726) to and/or from the user equipment 700.

The illustrated user equipment 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the user equipment 700 are contemplated, it should be understood that these embodiments are illustrative, and should not be construed as being limiting in any way.

The user equipment 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The user equipment 700 may also include a video system 734. The video system 734 can be configured to capture, process, record, modify, and/or store video content. Photos and videos obtained using the image system 732 and the video system 734, respectively, may be added as message content to an MMS message, email message, and sent to another user equipment. The video and/or photo content also can be shared with other devices via various types of data transfers via wired and/or wireless user equipment as described herein.

The user equipment 700 also can include one or more location components 736. The location components 736 can be configured to send and/or receive signals to determine a geographic location of the user equipment 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the user equipment 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the user equipment 700. Using the location component 736, the user equipment 700 can generate and/or receive data to identify its geographic location, or to transmit data used by other devices to determine the location of the user equipment 700. The location component 736 may include multiple components for determining the location and/or orientation of the user equipment 700.

The illustrated user equipment 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the user equipment 700 can include additional and/or alternative components, the above embodiment should be understood as being illustrative of one possible operating environment for various embodiments of the concepts and technologies described herein. The described embodiment of the user equipment 700 is illustrative, and therefore should not be construed as being limiting in any way.

Based on the foregoing, it should be appreciated that concepts and technologies directed to screening audiovisual content presented by a media application having a locked application programming interface for filtering without accessing the locked application programming interface have been disclosed herein. Although the subject matter presented herein has been described in language specific to computer structural features, methodological and transformative acts, specific computing machinery, and computer-readable mediums, it is to be understood that the concepts and technologies disclosed herein are not necessarily limited to the specific features, acts, or mediums described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:
1. A system comprising:
a processor; and
a memory that stores computer-executable instructions that, in response to execution by the processor, cause the processor to perform operations comprising:
detecting a content stream directed to a media application stored on a user equipment, wherein audiovisual content of the content stream is presented on a display of the user equipment via execution of the media application,
determining that an application programming interface corresponding to the media application is locked such that the media application is not accessible via the application programming interface by applications lacking credentials to access the application programming interface,
in response to determining that the application programming interface is locked such that the media application is not accessible via the application programming interface by applications lacking credentials to access the application programming interface, directly accessing the display of the user equipment to access the audiovisual content that is being presented on the display by the media appli- cation without accessing the application programming interface corresponding to the media application,
scraping the audiovisual content directly from the display for a time period while the content stream is being presented on the display by the media application, wherein the scraping creates scraped audiovisual content corresponding to the audiovisual content that was presented on the display during the time period, and
creating an instance of an audiovisual screening package comprising the scraped audiovisual content to determine an audiovisual content identifier that identifies the audiovisual content while the application programming interface remains locked.

2. The system of claim 1, wherein the operations further comprise determining that the audiovisual content identifier that identifies the audiovisual content cannot be obtained from the media application based on the application programming interface being locked.

3. The system of claim 1, wherein the operations further comprise obtaining the audiovisual content identifier for the audiovisual content based on the scraped audiovisual content while the application programming interface remains locked.

4. The system of claim 3, wherein obtaining the audiovisual content identifier for the audiovisual content based on the scraped audiovisual content while the application programming interface remains locked comprises:
providing the audiovisual screening package to a collective media screening system; and
instructing the collective media screening system to analyze the scraped audiovisual content to identify the audiovisual content and determine the audiovisual content identifier for the audiovisual content.

5. The system of claim 1, wherein directly accessing the display of the user equipment to access the audiovisual content includes bypassing the application programming interface of the media application.

6. The system of claim 1, wherein the operations further comprise:
determining that the content stream includes flagged audiovisual content corresponding to a queued portion of the audiovisual content that has not been presented on the display;
preparing an audiovisual content filter for the flagged audiovisual content; and
providing the audiovisual content filter to the display such that the audiovisual content filter filters the flagged audiovisual content provided by the media application without accessing the application programming interface.

7. The system of claim 6, wherein the audiovisual content filter includes one or more of an audio clip replacement instruction, an audio clip cancellation instruction, a content redirect instruction, a processor buffer instruction, a time jump instruction, an image overlay block, a visual distortion block, or a content summary block.

8. A method comprising:
detecting, by a system, a content stream directed to a media application stored on a user equipment, wherein audiovisual content of the content stream is presented on a display of the user equipment via execution of the media application;
determining, by the system, that an application programming interface corresponding to the media application is locked such that the media application is not accessible via the application programming interface by applications lacking credentials to access the application programming interface;
in response to determining that the application programming interface is locked such that the media application is not accessible via the application programming interface by applications lacking credentials to access the application programming interface, directly accessing, by the system, the display of the user equipment to access the audiovisual content that is being presented on the display by the media application without accessing the application programming interface corresponding to the media application;
scraping, by the system, the audiovisual content directly from the display for a time period while the content stream is being presented on the display by the media application, wherein the scraping creates scraped audiovisual content corresponding to the audiovisual content that was presented on the display during the time period; and
creating, by the system, an instance of an audiovisual screening package comprising the scraped audiovisual content to determine an audiovisual content identifier that identifies the audiovisual content while the application programming interface remains locked.

9. The method of claim 8, further comprising determining that the audiovisual content identifier that identifies the audiovisual content cannot be obtained from the media application based on the application programming interface being locked.

10. The method of claim 8, further comprising obtaining the audiovisual content identifier for the audiovisual content based on the scraped audiovisual content while the application programming interface remains locked.

11. The method of claim 10, wherein obtaining the audiovisual content identifier for the audiovisual content based on the scraped audiovisual content while the application programming interface remains locked comprises:
providing the audiovisual screening package to a collective media screening system; and
instructing the collective media screening system to analyze the scraped audiovisual content to identify the audiovisual content and determine the audiovisual content identifier for the audiovisual content.

12. The method of claim 8, wherein directly accessing the display of the user equipment to access the audiovisual content includes bypassing the application programming interface of the media application.

13. The method of claim 8, further comprising:
determining that the content stream includes flagged audiovisual content corresponding to a queued portion of the audiovisual content that has not been presented on the display;
preparing an audiovisual content filter for the flagged audiovisual content; and
providing the audiovisual content filter to the display such that the audiovisual content filter filters the flagged audiovisual content provided by the media application without accessing the application programming interface.

14. The method of claim 13, wherein the audiovisual content filter includes one or more of an audio clip replacement instruction, an audio clip cancellation instruction, a content redirect instruction, a processor buffer instruction, a time jump instruction, an image overlay block, a visual distortion block, or a content summary block.

15. A computer storage medium having computer-executable instructions stored thereon that, in response to execution by a processor of a system, cause the processor to perform operations comprising:

detecting a content stream directed to a media application stored on a user equipment, wherein audiovisual content of the content stream is presented on a display of the user equipment via execution of the media application;

determining that an application programming interface corresponding to the media application is locked such that the media application is not accessible via the application programming interface by applications lacking credentials to access the application programming interface;

in response to determining that the application programming interface is locked such that the media application is not accessible via the application programming interface by applications lacking credentials to access the application programming interface, directly accessing the display of the user equipment to access the audiovisual content that is being presented on the display by the media application without accessing the application programming interface corresponding to the media application;

scraping the audiovisual content directly from the display for a time period while the content stream is being presented on the display by the media application, wherein the scraping creates scraped audiovisual content corresponding to the audiovisual content that was presented on the display during the time period; and creating an instance of an audiovisual screening package comprising the scraped audiovisual content to determine an audiovisual content identifier that identifies the audiovisual content while the application programming interface remains locked.

16. The computer storage medium of claim 15, wherein the operations further comprise determining that the audiovisual content identifier that identifies the audiovisual content cannot be obtained from the media application based on the application programming interface being locked.

17. The computer storage medium of claim 15, wherein the operations further comprise obtaining the audiovisual content identifier for the audiovisual content based on the scraped audiovisual content while the application programming interface remains locked.

18. The computer storage medium of claim 17, wherein obtaining the audiovisual content identifier for the audiovisual content based on the scraped audiovisual content while the application programming interface remains locked comprises:

providing the audiovisual screening package to a collective media screening system; and instructing the collective media screening system to analyze the scraped audiovisual content to identify the audiovisual content and determine the audiovisual content identifier for the audiovisual content.

19. The computer storage medium of claim 15, wherein the operations further comprise:

determining that the content stream includes flagged audiovisual content corresponding to a queued portion of the audiovisual content that has not been presented on the display;

preparing an audiovisual content filter for the flagged audiovisual content; and providing the audiovisual content filter to the display such that the audiovisual content filter filters the flagged audiovisual content provided by the media application without accessing the application programming interface.

20. The computer storage medium of claim 19, wherein the audiovisual content filter includes one or more of an audio clip replacement instruction, an audio clip cancellation instruction, a content redirect instruction, a processor buffer instruction, a time jump instruction, an image overlay block, a visual distortion block, or a content summary block.

* * * * *